(12) United States Patent
Price et al.

(10) Patent No.: US 11,232,110 B2
(45) Date of Patent: Jan. 25, 2022

(54) NATURAL LANGUAGE KEYWORD TAG EXTRACTION

(71) Applicant: Capital One Services, LLC, McLean, VA (US)

(72) Inventors: Micah Price, Plano, TX (US); Qiaochu Tang, The Colony, TX (US); Jason Hoover, Grapevine, TX (US); Geoffrey Dagley, McKinney, TX (US); Avid Ghamsari, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/549,530

(22) Filed: Aug. 23, 2019

(65) Prior Publication Data

US 2021/0056114 A1    Feb. 25, 2021

(51) Int. Cl.
| | |
|---|---|
| *G06F 16/245* | (2019.01) |
| *G06F 16/2457* | (2019.01) |
| *G06N 20/00* | (2019.01) |
| *G06F 16/28* | (2019.01) |
| *G06F 16/9535* | (2019.01) |

(52) U.S. Cl.
CPC ...... *G06F 16/24578* (2019.01); *G06F 16/288* (2019.01); *G06F 16/9535* (2019.01); *G06N 20/00* (2019.01)

(58) Field of Classification Search
CPC .............................................. G06F 16/24578
USPC ........................................................ 707/730
See application file for complete search history.

(56) References Cited

U.S. PATENT DOCUMENTS

| | | | |
|---|---|---|---|
| 6,981,040 B1 | 12/2005 | Konig et al. | |
| 7,979,386 B1 | 7/2011 | Sholtis et al. | |
| 8,280,888 B1 * | 10/2012 | Bierner ................ | G06F 40/284 |
| | | | 707/738 |
| 8,412,698 B1 | 4/2013 | Sarukkai | |
| 8,447,758 B1 | 5/2013 | Adler et al. | |
| 8,515,893 B2 * | 8/2013 | Wilson .................. | G06N 5/022 |
| | | | 706/46 |

(Continued)

FOREIGN PATENT DOCUMENTS

WO    2019024838 A1    2/2019

OTHER PUBLICATIONS

Cer, D., et al., "Universal Sentence Encoder for English", Proceedings of the 2018 Conference on Empirical Methods in Natural Language Processing (System Demonstrations), Brussels, Belgium [online], Oct. 31-Nov. 4, 2018 [retrieved on Aug. 21, 2019], Retrieved from Internet URL: https://aclweb.org/anthology/D18-2029, 6 pages.

(Continued)

*Primary Examiner* — Pierre M Vital
*Assistant Examiner* — Andrew N Ho
(74) *Attorney, Agent, or Firm* — Kacvinsky Daisak Bluni PLLC

(57) ABSTRACT

Various embodiments are generally directed to techniques to provide specific vehicle recommendations to generic user requests. Various techniques, methods, systems, and apparatuses include utilizing one or more tags generated by application of a machine learning model to a data source, where the data source may include generic and specific language with respect to one or more automobiles or vehicles, to provide a recommendation for a particular automobile in response to a user request for a suggestion.

20 Claims, 14 Drawing Sheets

(56) References Cited

U.S. PATENT DOCUMENTS

| | | | |
|---|---|---|---|
| 8,589,399 B1* | 11/2013 | Lee | G06F 16/313 |
| | | | 707/737 |
| 8,706,557 B1 | 4/2014 | Tavares | |
| 8,805,774 B2 | 8/2014 | Boyer et al. | |
| 8,909,626 B2* | 12/2014 | Park | G06F 16/335 |
| | | | 707/723 |
| 9,454,581 B1 | 9/2016 | Garg et al. | |
| 9,852,228 B2 | 12/2017 | Martin | |
| 10,515,147 B2 | 12/2019 | Moore et al. | |
| 2003/0217052 A1 | 11/2003 | Rubenczyk et al. | |
| 2005/0065774 A1 | 3/2005 | Doganata et al. | |
| 2005/0240580 A1* | 10/2005 | Zamir | H04L 67/306 |
| 2008/0082479 A1 | 4/2008 | Chang et al. | |
| 2008/0282198 A1 | 11/2008 | Brooks et al. | |
| 2009/0006118 A1* | 1/2009 | Pollak | G06Q 30/0278 |
| | | | 705/306 |
| 2009/0094231 A1* | 4/2009 | Marvit | G06F 16/313 |
| 2009/0204609 A1* | 8/2009 | Labrou | G06F 16/3322 |
| 2009/0299978 A1 | 12/2009 | Farfumik et al. | |
| 2009/0327279 A1* | 12/2009 | Adachi | G06F 16/9535 |
| 2010/0145954 A1 | 6/2010 | Barlin et al. | |
| 2010/0274821 A1 | 10/2010 | Bernstein et al. | |
| 2011/0029636 A1* | 2/2011 | Smyth | G06F 16/958 |
| | | | 709/217 |
| 2012/0143924 A1* | 6/2012 | Sethi | G06F 16/2465 |
| | | | 707/803 |
| 2013/0031083 A1* | 1/2013 | Madhavan | G06F 16/951 |
| | | | 707/713 |
| 2013/0290905 A1 | 10/2013 | LuVogt et al. | |
| 2014/0067846 A1* | 3/2014 | Edwards | G06F 16/24578 |
| | | | 707/765 |
| 2014/0279263 A1* | 9/2014 | Liu | G06Q 30/0627 |
| | | | 705/26.63 |
| 2014/0280145 A1 | 9/2014 | Heit et al. | |
| 2015/0088846 A1 | 3/2015 | Roe et al. | |
| 2015/0100943 A1 | 4/2015 | Gabel et al. | |
| 2015/0169710 A1 | 6/2015 | Xu et al. | |
| 2016/0012507 A1 | 1/2016 | Narin | |
| 2016/0125459 A1 | 5/2016 | Tognetti | |
| 2016/0171549 A1 | 6/2016 | Rozental | |
| 2016/0179967 A1 | 6/2016 | Sa et al. | |
| 2016/0299977 A1 | 10/2016 | Hreha | |
| 2016/0364783 A1* | 12/2016 | Ramanuja | G06Q 30/0631 |
| 2017/0097823 A1 | 4/2017 | Chee et al. | |
| 2017/0169030 A1 | 6/2017 | Ben-Tzur | |
| 2018/0025044 A1 | 1/2018 | Hostetter et al. | |
| 2018/0032882 A1* | 2/2018 | Joshi | G06Q 30/0631 |
| 2018/0089556 A1 | 3/2018 | Zeiler et al. | |
| 2018/0107720 A1 | 4/2018 | Johnson et al. | |
| 2018/0165740 A1 | 6/2018 | Jadhav et al. | |
| 2018/0232441 A1 | 8/2018 | Lin et al. | |
| 2018/0247319 A1 | 8/2018 | Yoder et al. | |
| 2018/0336580 A1 | 11/2018 | Kato | |
| 2018/0349514 A1 | 12/2018 | Perez et al. | |
| 2019/0026815 A1 | 1/2019 | Zhou et al. | |
| 2019/0080225 A1 | 3/2019 | Agarwal et al. | |
| 2019/0087882 A1 | 3/2019 | Wollmer et al. | |
| 2019/0164211 A1 | 5/2019 | Andrew et al. | |
| 2019/0205962 A1 | 7/2019 | Piramuthu et al. | |
| 2019/0213663 A1 | 7/2019 | Chowdhury | |
| 2019/0266158 A1 | 8/2019 | Bolla et al. | |
| 2019/0278776 A1 | 9/2019 | Villafane | |
| 2019/0354802 A1 | 11/2019 | Lin et al. | |
| 2020/0226418 A1 | 7/2020 | Dorai-Raj et al. | |

OTHER PUBLICATIONS

Kalaivani, P., et al., "Sentiment Classification of Movie Reviews by Supervised Machine Learning Approaches", Indian Journal of Computer Science and Engineering 4(4): 285-292, Year 2013.

Stanley et al., "Comparing Vector-Based and ACT-R Memory Models Using Large-Scale Datasets: User Customized Hashtag and Tag Prediction on Twitter and StackOverflow", 2014; Published at Rice University; ProQuest Dissertations Publishing, extracted from Dialog Solutions on May 25, 2020, 17 pages.

* cited by examiner

| Make/Model-Tag-Matrix | Make/Model 1 | Make/Model 2 | Make/Model 3 | Make/Model 4 | Make/Model 5 |
|---|---|---|---|---|---|
| Tag 5 "Powerful" | 0.3 | 0.8 | 0.5 | 0.1 | 0.4 |
| Tag 4 "Fast" | 0 | 0.4 | 0.3 | 0.4 | 0.9 |
| Tag 3 "Spacious" | 0 | 0.4 | 0.2 | 0.7 | 0 |
| Tag 2 "Awesome" | 0.9 | 0 | 0.6 | 0.1 | 0 |
| Tag 1 "Jealous" | 0.5 | 0.5 | 0.1 | 0 | 0 |

| Make/Model Matrix | Make/Model 1 | Make/Model 2 | Make/Model 3 | Make/Model 4 | Make/Model 5 |
|---|---|---|---|---|---|
| Make/Model 5 |   | 0 | 2 | 1 | 1 |
| Make/Model 4 |   | 0 | 1 | 0 |   | 1 |
| Make/Model 3 |   | 1 | 1 |   | 0 | 1 |
| Make/Model 2 |   | 1 |   | 1 | 2 | 2 |
| Make/Model 1 |   |   | 1 | 1 | 0 | 0 |

| Tag Matrix | Tag 1 | Tag 2 | Tag 3 | Tag 4 | Tag 5 |
|---|---|---|---|---|---|
| Tag 1 |  | 1 | 1 | 1 | 1 |
| Tag 2 | 1 |  | 0 | 0 | 1 |
| Tag 3 | 1 | 0 |  | 2 | 1 |
| Tag 4 | 1 | 0 | 2 |  | 2 |
| Tag 5 | 1 | 1 | 1 | 2 |  |

*FIG. 2E*

NATURAL LANGUAGE KEYWORD TAG EXTRACTION

BACKGROUND

The present embodiments relate to machine learning, and more particularly machine learning to provide automobile information to users.

Electronic requests, for information or otherwise, made by users for products and services are prevalent in the current marketplace, but current services for making such requests, including search engines, suffer in the quality of delivering information concerning products and services, especially if a request employs generic language and it is the intent of the user to obtain information about a specific product. Accordingly, there is a need to improve the quality of responses associated with electronic search requests, including in the automobile context.

SUMMARY

One aspect of the present disclosure includes a computer implemented method for providing a vehicular recommendation to one or more users. The method including: receiving a request for an automobile selection from a user, generating, from a plurality of terms in a data source, a first plurality of tags related to a first automobile make and model of a plurality of automobile make and models, the generating including applying a term frequency-inverse document frequency (TF-IDF) model to the plurality of terms, where the TF-IDF model performs a threshold computation that assigns a higher value to one or more terms of the plurality of terms with i) a lower overall-frequency within the data source in relation to all of the plurality of automobile makes and models and ii) a higher frequency within the data source in relation to a particular automobile make and model of the plurality of automobile makes and models, where only one or more terms exceeding a threshold score associated with the threshold computation form a basis for the first plurality of tags, and responsive to the request, transmit a suggestion for a particular automobile selection based on the first plurality of tags via an electronic medium.

Another aspect of the present disclosure includes an apparatus configured to provide a vehicular recommendation to one or more users. The apparatus includes: a memory to store instructions, and processing circuitry, coupled with the memory, operable to execute the instructions, that when executed, cause the processing circuitry to: receive a natural language request for an automobile selection from a user, in response to the received natural language request, provide a suggestion for a particular automobile make and model to the user based on mapping the received request to a first plurality of tags, where the first plurality of tags are generated based on a term frequency-inverse document frequency (TF-IDF) model, where the TF-IDF model performs a threshold computation that assigns a higher value to one or more terms of a data source with i) a lower overall-frequency within the data source in relation to all of the plurality of automobile makes and models and ii) a higher frequency within the data source in relation to a particular automobile make and model of the plurality of automobile makes and models, and where the one or more terms forms a basis for the first plurality of tags.

Yet another aspect of the present disclosure includes a non-transitory computer-readable storage medium storing computer-readable program code executable by a processor to provide a vehicular recommendation to one or more users. The computer-readable program code executable by a processors including the ability to generate, from a plurality of terms in a data source, a plurality of tags related to an automobile make and model of a plurality of automobile make and models, the generating including applying a term frequency-inverse document frequency (TF-IDF) model to the plurality of terms, where the TF-IDF model performs a threshold computation that assigns a higher value to one or more terms of the plurality of terms with i) a lower overall-frequency within the data source in relation to all of the plurality of automobile makes and models and ii) a higher frequency within the data source in relation to a particular automobile make and model of the plurality of automobile makes and models, where only one or more terms exceeding a threshold score associated with the threshold computation form a basis for the plurality of tags, and further including the ability to configure a vehicle search interface with one or more filters based on the plurality of tags.

BRIEF DESCRIPTION OF THE DRAWINGS

FIG. 2C illustrates a occurrence matrix useful for providing vehicular information and pursuant to at least one embodiment of the present disclosure.

FIG. 2D illustrates a co-occurrence matrix useful for providing vehicular information and pursuant to at least one embodiment of the present disclosure.

FIG. 2E illustrates a co-occurrence matrix useful for providing vehicular information and pursuant to at least one embodiment of the present disclosure.

DETAILED DESCRIPTION

Figure 1:
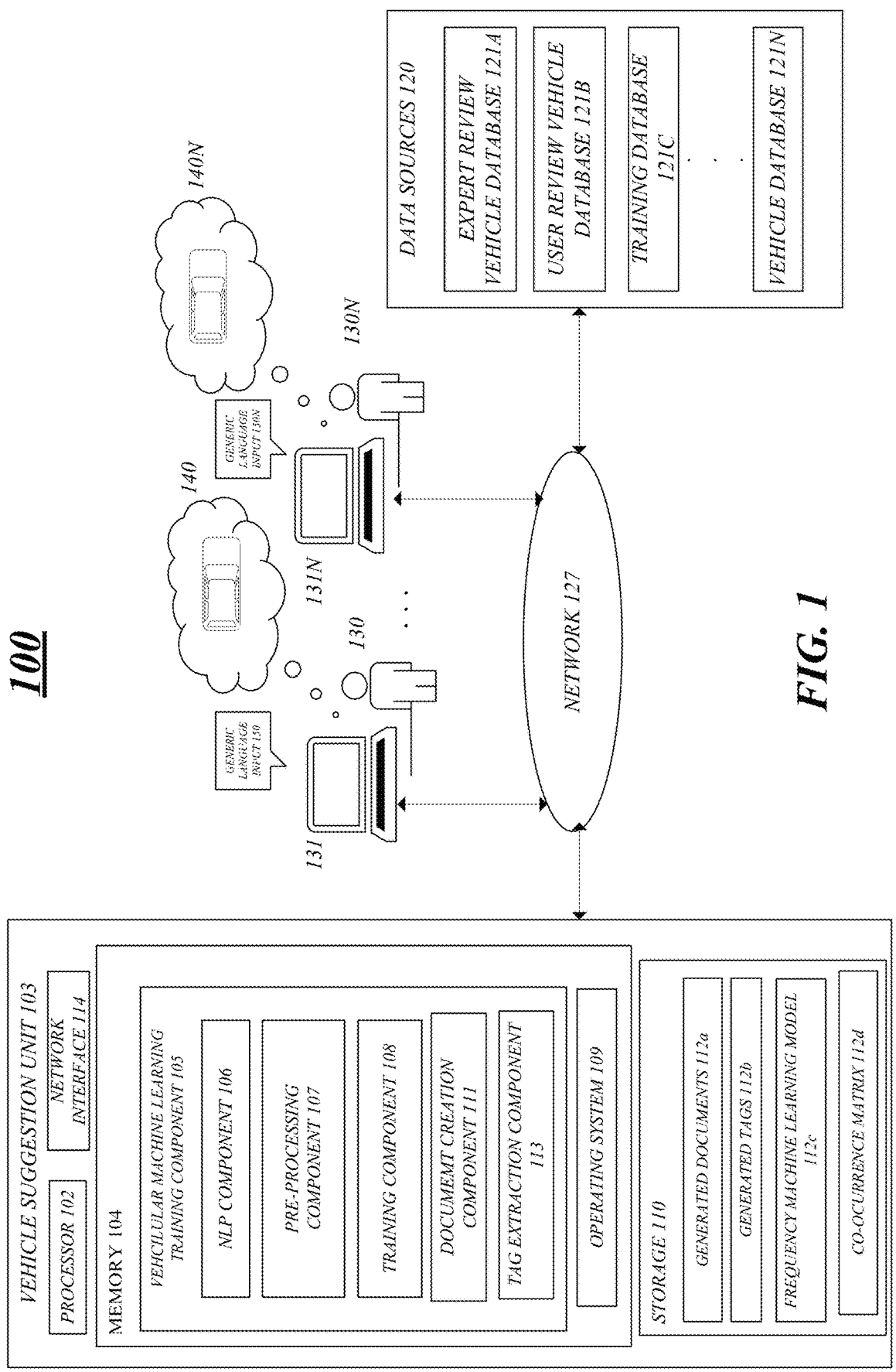
FIG. 1 illustrates an example of a system for providing vehicular information according to at least one embodiment of the present disclosure.

Various embodiments are generally directed to techniques, systems, and processing flows to improve the functionality of natural language systems and processors in processing generic user requests with respect to automobiles, such as cars, motorcycles, boats or any other suitable vehicle associated with transportation. One or more embodiments include a vehicle suggestion system that can receive and process a generic request for automobile information and provide a specific automobile suggestion to a user. In one or more embodiments, the vehicle suggestion system utilizes a plurality of tags that are generated using machine learning techniques in order to provide a particular automobile suggestion to a user making a natural language request. In one or more embodiments, the plurality of tags may be created by applying a frequency-based machine learning model to one or more data sources containing references of generic language in relation to vehicles or automobiles and specific language in relation to the vehicles or automobiles, e.g., such as user and/or expert reviews of automobiles or vehicles. In one or more embodiments, the plurality of tags can be mapped to the user request in order to provide a user with an appropriate automobile or vehicular suggestion; and in one or more embodiments the plurality of tags may be used as a filter in relation to an interface where the user enters the natural language response, which by extension may provide an automatic technique for mapping the plurality of tags to one or more natural language requests made by the user.

In various embodiments, since the generic language of the one or more data sources relates to specific vehicle features and/or automobiles, e.g., a particular make and model, and since the generic language associated with the data source may be similar to language used by the user to make a natural language request (e.g. an automobile selection request by natural language), utilizing the plurality tags can increase the accuracy of the suggestion provided by a system employing the tags. Moreover, in various embodiments where the plurality of tags are used to configure an interface associated with making a natural language request, multiple user requests may be processed simultaneously, while taking advantage of the enhanced accuracy associated with the mapping one or more tags to a user request.

In various embodiments, a co-occurrence matrix may be developed by determining one or more relationships amongst the tags and vehicles and/or automobiles associated with the tags, which reveals a relationship amongst more than one vehicle and/or automobile, which in turn may permit a system utilizing the plurality of tags to provide more than one recommendation or suggestion in response to a natural language request made by a user. This, in turn, enhances the likelihood that an appropriate suggestion can be provided to the user. Furthermore, in various embodiments, all of the plurality of tags associated with a particular vehicular or automobile feature may be consolidated into a single document and/or all of the plurality of tags associated with any, e.g., multiple and different, vehicular or automobile features can be consolidated into a single document, where the consolidation can improve device functionality when providing a user recommendation or suggestion at least because a single source contains the relevant material useful for mapping a natural language request, which in turn reduces the computing resources required to render a recommendation (by eliminating redundant steps that might otherwise be required to both generate and consolidate the relevant information required to provide a response to the user).

In various embodiments, the machine learning model that may be utilized to generate the tags can be any suitable machine learning model type, e.g., or a word-frequency model (word frequency machine learning model). In various embodiments, in order to enhance the probability that a particular term is more likely than not to have a positive association in relation to a particular automobile or vehicular feature, a term frequency-inverse document frequency (TF-IDF) model can be utilized on one or more data sources to generate the plurality of tags. The TF-IDF model can increase the associative and predictive quality of the plurality of tags, and by extension any suggestion provided as a result of utilizing the plurality of tags, at least because the TF-IDF model reduces the value ascribed to a term associated with various vehicular and automobile features and increases the value ascribed to a more limited number of particular vehicular and automobile features (in relation to those particular vehicular and automobile features).

In one or more embodiments, the natural language processing enhancement(s) provided by the machine learning model, including the ability to receive generic automobile input and provide a specific automobile output or suggestion (directed at user preferences), permit one or more users to enter a generic automobile information request by a single uniform input, either through a chatbot or a single field in a proper electronic medium, such as a search engine or search field contained in a website offering services, including the sale and financing of automobiles and/or vehicles.

Reference is now made to the drawings, wherein like reference numerals are used to refer to like elements. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example of a vehicular suggestion system 100 that can provide a specific automobile suggestion in response to a generic input by a user. The vehicular suggestion system 100 can also provide a single-entry point to enter the entirety of the generic input by the user and can provide an output that is a distribution of particular vehicular or automotive features and the likelihood that the automotive features correspond to the generic input, e.g., a distribution based on a likelihood that specific vehicular or automotive features are what the user would want with respect to the generic language. The "units" or "components" described in the system, whether contained in memory or otherwise employed therein, can be any suitable software, logic (hardware or software), or hardware element specifically configured to perform or be used in the performance of one or more tasks or functions as discussed herein.

In one or more embodiments, the vehicular suggestion system 100 can include a vehicle suggestion unit 103, which in turn includes one or more processors 102, memory 104, storage 110 and a network interface 114. The one or more processors 102 can be any suitable software or hardware computer components for carrying out any operation as discussed herein. The memory 104 can be any suitable component or unit for storing protocols, information, algorithms, and/or instructions for execution by the one or more processors, e.g., the memory 104 may be any volatile and/or non-volatile memory capable of storing information during and/or for the execution of instructions. The devices, systems, sources, units and/or components of the vehicle suggestion unit 103 can be coupled to a network 127, e.g., the Internet, via one or more wired and/or wireless network links, and can be accessed by one or more network interfaces 114.

In one or more embodiments, the vehicle suggestion unit 103 can interact with one or more users or clients 130 . . . 130N (and associated user/client computing devices 131 . . . 131N, e.g., a laptop, mobile phone, tablet, or desktop computer) via a network interface 114 that can access the network 127, and the vehicle suggestion unit 103 can interact with one or more data databases or data sources 120 also via the network interface accessing the network 127, wherein one or more embodiments the one or more data sources can include an expert review vehicle database (or expert review vehicle database) 121A, a user review vehicle database (or user review vehicle database) 121B, a training set database (e.g., based on data in one or more databases 121A, 121B and/or other sources) and other databases, such as 121N. In various embodiments, the vehicle suggestion unit can be a web-plugin configuration installed or otherwise configured to run directly on computing devices 131 . . . 131N.

In one or more embodiments, the memory 104 can include a vehicular machine learning training component 105 and an operating system 109, where the operating system 109 can be any suitable operating system compatible with system 100. In one or more embodiments, the vehicular machine learning training component 105 can further include a natural language processing component ("NLP") 106, a pre-processing component 107, a training component 108, a document creation component 111, and a tag extraction component 113. In one or more embodiments, the one or more components of the vehicle suggestion unit 103 process generic natural language inputs 150 . . . 150N from the one or more users 130 . . . 130N, and based on one or more tags generated from processed information associated with data sources or databases 120, provide a specific vehicular suggestion 140 . . . 140N to the one or more users 130 . . . 130N and/or one or more tags via a display associated with the one or more user computing devices 131 . . . 131N.

In one or more embodiments, the vehicle suggestion unit 103 is configured to provide a chatbot to the one or more users 130 . . . 130N via the one or more user computing devices 131 . . . 131N, where the chatbot provides general questions to the one or more users 130 . . . 130N about what vehicle type, feature, or make and model the one or more users 130 . . . 130N are interested in, where the one or more users 130 . . . 130N provide a generic response, e.g., 150, 150N, to the chatbot, and where the chatbot, as configured by the vehicle suggestion unit 103, provides a specific vehicular suggestion and/or one or more tags to the one or more users 130 . . . 130N based on the input. In various embodiments, the chatbot, display, or interface associated with receiving the input from the one or more users 130 . . . 130N can be configured by the tag extraction component 113 to utilize one or more tags 112b generated by the tag extraction component 113 (discussed in greater detail below) as a filter in relation to an input from the one or more users 130 . . . 130N, e.g., matching one or more tags, with an associated probability in relation to one or more vehicle or automobile features, to language associated with an input from the one or more users 130 . . . 130N. In various embodiments, the one or more tags can be part of a co-occurrence matrix 112d that is stored in storage 110 and can be generated by the tag extraction component 113, where one or more types of co-occurrence matrixes (and generation of the same) are discussed with respect to FIGS. 2C-F.

In one or more embodiments, whether a chatbot scheme is used or whether the vehicle suggestion unit 103 can be configured to cause the display of the computing devices 131 . . . 131N to provide a single field that can handle the entirety of a generic request provided by the one or more users 130 . . . 130N, the functionality of the overall system 100 is improved by having a single interface that can accommodate the entire user request, as opposed to requiring multiple fields, where each field requires a specific feature to be searched in a database in order to provide a specific vehicle suggestion to the one or more users 130 . . . 130N.

In one or more embodiments, the NLP component 106 may receive and process a natural language input from the expert review vehicle database 121A, the user vehicle review database 121B, the training database 121C, and/or the vehicle database 121N. The natural language input can be in text form or any other suitable form for processing by the NLP component 106.

In one or more embodiments, the expert review vehicle database 121A may have generic language provided by experts concerning vehicles and associated features, e.g., "a family-friendly vehicle" or "a vehicle that will make your friends jealous," etc. The generic language can be part of a review that associates the general language with a particular vehicular or automotive feature, e.g., an automobile with a V-6 engine, or a specific make and model provided by a particular manufacturer. For example, "an automobile with a V-6 engine will make your friends jealous" or "Model X made by manufacturer Y is a family-friendly vehicle" or "Model X made by manufacturer Y is a family-friendly vehicle because it has large cargo space," etc. The vehicle(s) discussed in the expert review vehicle database 121A can be automobiles, such as cars, motorcycles, boats, planes, or any other system(s) for facilitating mechanical transportation from one point to another. In one or more embodiments, the database 121A can be directed exclusively to cars with the reviews being provided by individuals with established expertise in the automotive field, such as mechanics, individuals with years of writing experience for particular automotive publications, etc.

Similarly, in one or more embodiments, the user review vehicle database 121B may have generic language provided by vehicle users concerning vehicles and associated features, e.g., "my vehicle is a road-buster" or "my friends love this car," etc. In one or more embodiments, the generic language may be part of a review that associates the general language with a particular vehicular or automotive feature, e.g., fuel efficiency (a specific metric associated therewith), engine size, or horsepower, or a specific make and model provided by a particular manufacturer. For example, "my friends love my car because it has a V-6 engine" or "my Model X made by manufacturer Y is a family-friendly vehicle" or "my Model X made by manufacturer Y is a family-friendly vehicle because it has large cargo space," etc. The vehicle(s) discussed in the user review vehicle database 121B can be automobiles, such as cars, motorcycles, boats, planes, or any other system(s) for facilitating mechanical transportation from one point to another. In one or more embodiments, the database 121B can be directed exclusively to cars with the reviews being provided by individuals that own, owned, used, have used, or otherwise experienced particular automobiles and/or vehicles.

In one or more embodiments, the training database 121C vehicle databases and 121N can be additional expert review vehicle databases, user review vehicle databases, databases containing the location of vehicles for sale, the price range of vehicles generally or based on location, e.g., nationally vs. a specific location, such as a city or town, vehicle safety ratings, reviews for vehicles by customers, or any other information related to vehicles. As with database 121A, the vehicle(s) discussed in databases 121C and 121N can be automobiles, such as a car, motorcycles, boats, planes, or any other system(s) for facilitating mechanical transportation from one point to another, wherein one or more embodiments, the databases 121C . . . 121N are exclusively related to cars. In one or more embodiments, database 121C contains portions of databases 121A and 121B that can be used to train one or more machine learning models.

In one or more embodiments, the NLP component 106 can have a filtering mechanism to ensure that the database 121A is in fact an expert review vehicle database (or another kind of database as may be desirable), where the filtering mechanism can be a pre-configuration by a system designer, e.g., directing the system to a known expert publication database publicly available over the Internet, a matching mechanism that matches known expert reviewer names to a database (not shown) of known names for providing expert reviews, a threshold mechanism that looks for a certain number of known reviewers in the corpus of the database 121A before determining that the corpus of one or more expert reviews is an expert review repository (or for a certain number of assertions that particular reviews are expert reviews), any other suitable mechanism for making a determination that the expert review vehicle database 121A is in fact sufficiently populated with information that can be considered as expert reviews, or any combination therewith.

Similarly, in one or more embodiments, the NLP component 106 can have a filtering mechanism to ensure that the database 121B is in fact a user review vehicle database (or another kind of database as may be desirable), where the filtering mechanism can be a pre-configuration by a system designer, e.g., directing the system to a known user publication or comment database publicly available over the Internet, a matching mechanism that looks for media evidence that a particular user owns or has experienced a particular automobile (such as a picture or video using the vehicle), a threshold mechanism that looks for a certain number of community approvals with respect to one or more users, or any other suitable mechanism for making a determination that the expert review vehicle database 121A is in fact sufficiently populated with information that can be considered as user reviews, or any combination therewith.

In one or more embodiments, the training component 108 of the vehicular machine learning training component 105 generates one or more suitable machine learning models that can be used to generate one or more tags 112b, which in turn can be used to provide specific vehicle and automobile suggestions, e.g., 140, 140N, based on generic inputs, e.g., 150, 150N. In one or more embodiments, the machine learning model(s), as discussed in greater detail with respect to FIG. 2A can be word frequency machine learning model(s) 112c. The training component 108 can train the one or more machine learning models, e.g., 112c, based on data provided by the one or more databases 120, including but not limited to the training database 121C, which can include parts of one or more of the expert review vehicle database 121A and/or the vehicle database(s) 121B . . . 121N. In various embodiments, when the training component 108 utilizes the training database 121C to train the one or more models, and when the training database 121C contains data associated with either one or both of the expert review vehicle database 121A and/or the user review vehicle database 121B (or any other database used to generate tags after training), then that data is removed if the one or more machine learning models are applied to either one or both of the expert review vehicle database 121A and/or the user review vehicle database 121B (or any other database) to generate the tags.

Figure 2A:
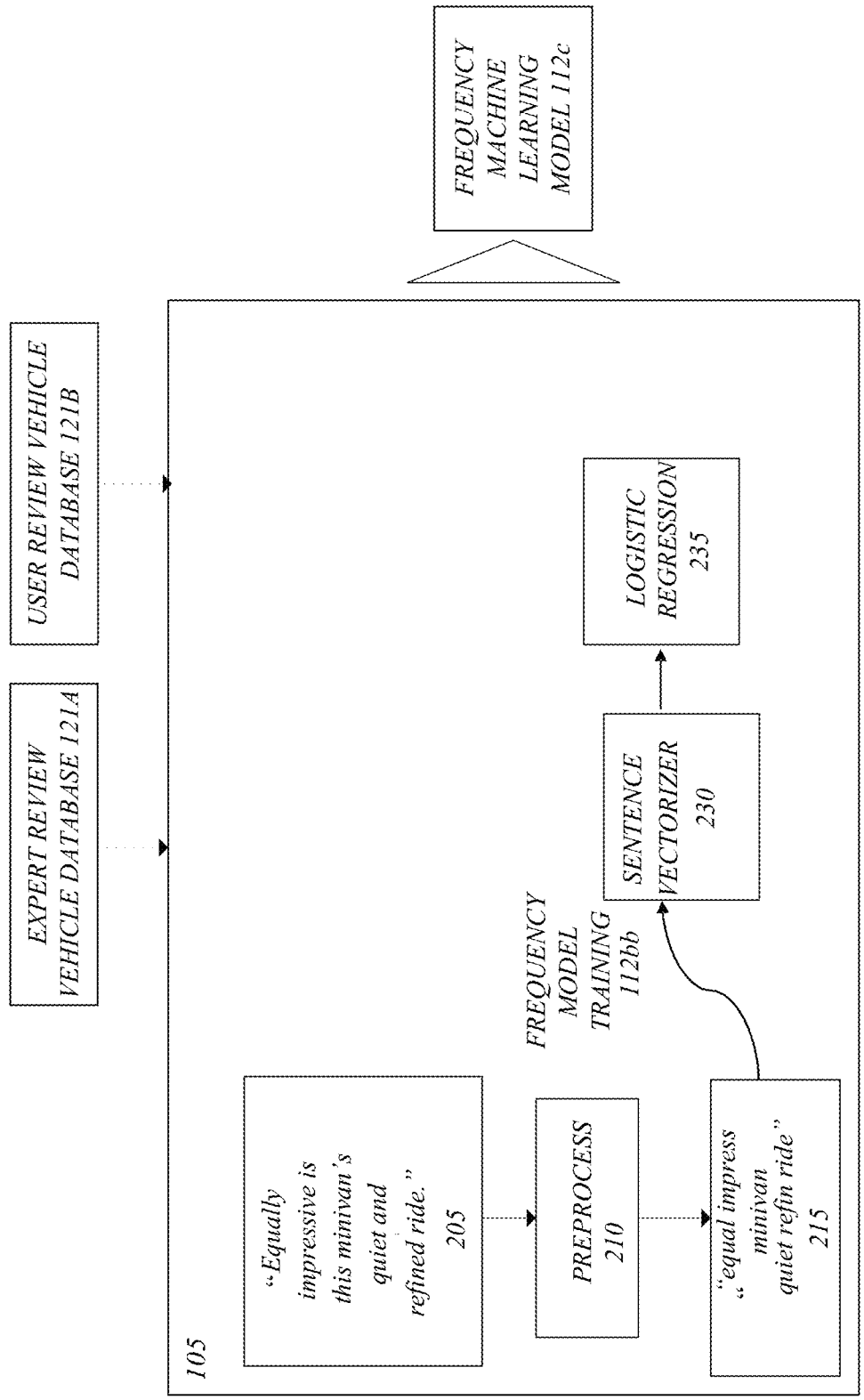
FIG. 2A illustrates an example of training a machine learning model and a system for providing vehicular information and useful for generating one or more tags according to at least one embodiment of the present disclosure.

By way of non-limiting example, in one or more embodiments, the machine learning models, as discussed further with respect to FIG. 2A, can determine a relationship between generic terms contained in expert or user reviews, e.g., "a vehicle that will make your friends jealous" to a particular automobile feature, e.g., "a V-6 engine" or a make and model associated with the term, and are then able to facilitate a prediction of what specific vehicular feature is being referred to or requested based on a generic input. The tag extraction component 113 can utilize the determination of the machine learning model or models 112c to generate one or more tags 112b. In embodiments where the machine learning model 112c is a TF-IDF model 112c, each tag can be associated with a probability distribution in relation to the TF-IDF model with respect to one more vehicle or automobile features, and the tag extraction component 113 can provide the tags corresponding to a highest probability that they are related to a particular automobile or vehicular suggestion entered by a user and/or can provide actual automobile or vehicular feature suggestions, e.g., 140, 140N, to the user, which can be all of the vehicle or automobile features associated with tag in rank order (e.g., based on probability). In various embodiments, the tag extraction component 113 can provide a tag associated with a highest probability in relation to the user request and/or a highest probability automobile and/or vehicular feature associated with the highest probability tag itself.

In one or more embodiments, as the one or more models are trained, the one or models can determine that a particular expert or user review is referring to a particular vehicle feature or features based on previously processed data associated with other expert or user reviews in training database 121C (or in databases 121A and/or 121B if discrete segments of those databases are used for training), which can enhance the accuracy of the model, e.g., 112c, by adding additional training steps or layers (e.g., a neural network) based on the confirmation (and before receiving any user requests) and/or the training component 108 can be configured to skip fully processing an expert or user review when generic language associated with a specific automobile feature, e.g., language referring to a specific automobile feature, and the underlying relationship associated therewith, can be determined from an already processed expert or user review. In the latter case, computer resources are preserved, and the processing speed is increased by avoiding redundancies.

In one or more embodiments, the training component 108 configures the training of the machine learning models 112c to consider additional factors, independent of the training database 121C and/or the frequency of terms associated therewith. In one or more embodiments, the training component 108 can be configured to institute a feedback loop when training is completed for the machine learning models 112c, where, after being trained and being used for their intended purpose, the feedback loop enables the machine learning models 112c to consider user selection in generating a distribution of probabilities or a specific probability. In various embodiments, the machine learning model 112c can be configured to incorporate feedback from the training component 108, e.g., the output of a particular distribution of probabilities that a particular term can be altered based on actual user selection. For example, if the phrase "a vehicle that will make your friends jealous," and tag associated therewith, e.g., "jealous," is associated with one or more vehicles and a probability that the tag (and by extension the overall phrase) is associated with the one or more vehicles, where each vehicle is associated with a particular probability that a particular tag is associated therewith, actual user selection of one or more of the vehicles can adjust the overall distribution and the probability associated with the selected features for a subsequent query, e.g., when the one or more users 130 . . . 130N make a subsequent query. In various embodiments, the tag extraction component 113 can then update the probability distribution of features associated with one or more tags 112b, and by extension, the one or more tags 112b and/or one or more features associated therewith that are provided and displayed to the user.

Any variation of the above features or other suitable features, including features as discussed with reference to the description of various embodiments for the one or more databases 120, can be used as feedback or input features for the machine learning models 112c during training and/or incorporated into the protocol for providing an output to distribution to the one or more users 130 . . . 130N.

The trained machine learning models 112c can be stored in storage 110 and utilized by one or more components of the vehicle suggestion unit 103, including but not limited to the processor 102 and the tag extraction component 113, and/or any other suitable component, unit or system as disclosed herein, to generate the one or more tags 112b, where the one or more tags can be utilized to provide a specific vehicular or automobile suggestion, including a particular make and model of a vehicle.

In one or more embodiments, the ingested texts from training database 121C (e.g., the expert review vehicle database 121A, and/or the user review vehicle database 121B, and/or the vehicle databases 121N) can be pre-processed by the pre-processing component 107 before being used by the training component 108 to train the models, e.g., removing some or all of verbs, pronouns, and stop words from ingested sentences, removing sentences that are irrelevant, e.g., having nothing to do with vehicles (such as a copyright statement in an article review). In one or more embodiments, the pre-processing is valuable at least because training any model with condensed and relevant material increases processing speed and training accuracy. Moreover, pre-processing can result in a single term being extracted from a phrase and associated with a particular probability that a generic phrase relates to a specific automobile or vehicular feature, which in turn can constitute a tag that can be used as described herein.

The pre-processing component 107 can also be used by the tag extraction component 113 in order to reduce a generic phrase to a single word before or after applying the machine learning model 112c to a dataset to extract one or more tags, (wherein various embodiments the machine learning model 112c could have been trained with or without pre-processing terms from the relevant datasets, e.g., 121C), wherein various embodiments, the pre-processing component 107 is a post-processing component, e.g., processing occurs after training of a model and its after its application to a particular generic phrase, term or bigram from databases 121A and/or 121B. For example, during training the training component 108 can ingest a phrase, e.g., "Model X made by manufacturer Y is a family-friendly vehicle," as part of training a word-frequency model, and a particular probability that Model X made by manufacturer Y is associated with the phrase "is a family-friendly vehicle" can be determined using word-frequency techniques and without pre-processing the phrase down to a single word. Once the model is applied to another dataset or to portions of a dataset not utilized during training, e.g., databases 121A and 121B, the tag extraction component 113 can coordinate with the pre-processing component 107 to process the term "is a family-friendly vehicle" to a single word, bigram, or word combination, e.g., "family-friendly" after applying the model to the datasets (or before application to the datasets 121A and/or 121B, but after training), such that the processed term, e.g., "family-friendly," constitutes a tag. In various embodiments, a phrase, sentence, or entire passage, without processing before or after training is completed, can be a tag part of the one or more tags 112b.

In various embodiments, the tag extraction component 113 can consolidate one or more tags of the tags 112b that meet a certain probability threshold (or another suitable threshold), in relation to a particular vehicular automobile or automobile feature, e.g., a particular make and model, into a single document. In various embodiments, more than one document can be prepared, where each document corresponds to a distinct automobile or vehicular features and forming a generated document set 112a, where the generated document set 112a can be an aggregated document set 112a.

In various embodiments, this can enhance the efficiency of the system 100 when providing tags and/or an automobile suggestion to a user (e.g., in response to a user query) as all related tags are located in a single document and can be extracted without expending unnecessary computer resources. In various embodiments, the aggregation of related tags into a single document can occur prior to or after processing a phrase down to a single term or bigram.

Embodiments are not limited in the above manner, and the above system is merely an exemplary embodiment for implementing one or more features of the present disclosure.

FIG. 2A illustrates one or more embodiments 200A for training and/or utilizing a machine learning model according to the present disclosure and for extracting one or more tags from one or more data sources. In one or more embodiments of FIG. 2A, one or more components of FIG. 1 are included. Any suitable component of the vehicular machine learning training component 105.

The vehicular machine learning training component 105 can, during training, train the model, e.g., 112c, to make a prediction on where in the corpus of expert reviews from the expert review vehicle database 121A (and/or the user review vehicle database 121B) a particular sentence is located, e.g., vehicle prediction and/or to link or associate specific language to generic language in the databases 121A and 121B.

In one or more embodiments, the vehicular machine learning training component 105 may receive an input 205 from the one or more databases 120, e.g., the training dataset 120C. The vehicular machine learning training component 105 can preprocess 210 the text before training the model 112c. For example, if the training dataset 120C includes an expert review from the expert review vehicle database 121A, which states "equally impressive is this minivan's quiet and refined ride," then the vehicular machine learning training component 105 can remove all verbs, conjunctions, extraneous words, and reduce all inputs to root words, such that whatever machine learning configuration is applied, the input may be "equal impress quiet refine ride" 215. In one or more embodiments where preprocessing is applied, computational resources can be reserved when training a model and/or when reusing it.

In one or more embodiments, a word frequency model training 112bb occurs, and employs a sentence vectorizer 230, e.g., a term frequency, to an entire database, e.g., the training database 121C, to determine a relationship between a particular vehicle feature, e.g., make and model, to a particular generic word, term, bigram, phrase, or sentence. (As discussed above, the data can be pre-processed prior to vectorizing it). For example, in the case where TF-IDF is used, the number of times a generic term or word, e.g., "jealous" or bigram, e.g., "very jealous," or a phrase., e.g., "this minivan is quiet and refined", is used in the one or more of collection of expert or user reviews in database 121C, which can also be in one or more databases 121A and/or 121B for a particular vehicle, e.g., make/model (or a collection of reviews for other specific functional, mechanical, or aesthetic features of a vehicle), offset by a factor, e.g., the total number of expert reviews in database 121C (and/or 121A and/or user reviews in database 121B), results in an associated mathematical representation of that frequency.

In one or more embodiments, the output of the sentence vectorizer 230 is fed into a classifier, normalizer, or any other suitable model or technique, e.g., a logistic regression scheme/model 235 to train the model 113c. In various embodiments, when the regression scheme/model and/or the models 235 is otherwise a TF-IDF model, a lower overall-frequency within the database 121C in relation to all of the vehicular or automotive features, e.g., a generic term does not reference all of or more of the makes and models described in database 121C, receives a higher score with respect to a particular vehicular or automotive feature, e.g., a particular make and model, when it is used in association at a higher-frequency than other generic terms or phrases in relation to that particular make and model. A tag extraction component 113, once the trained model 235 is developed, e.g., model 112c, can apply a threshold based on the scores or probabilistic distribution generated by the model and as applied to another dataset, to determine that one or tags meeting or exceeding the threshold are related to one or more tags, where those tags can be aggregated into one or more documents, each document corresponding to a particular make and model. Since the language in expert or user reviews may be similar to generic language used by a user when describing or requesting a vehicle, and by extension similar to the one or more tags, a high probability that a particular tag corresponds to a particular vehicular or automotive feature, e.g., a particular make and model, is likely to also mean that the particular vehicular or automotive feature corresponds to a request of a user associated with the generic language.

Figure 2B:
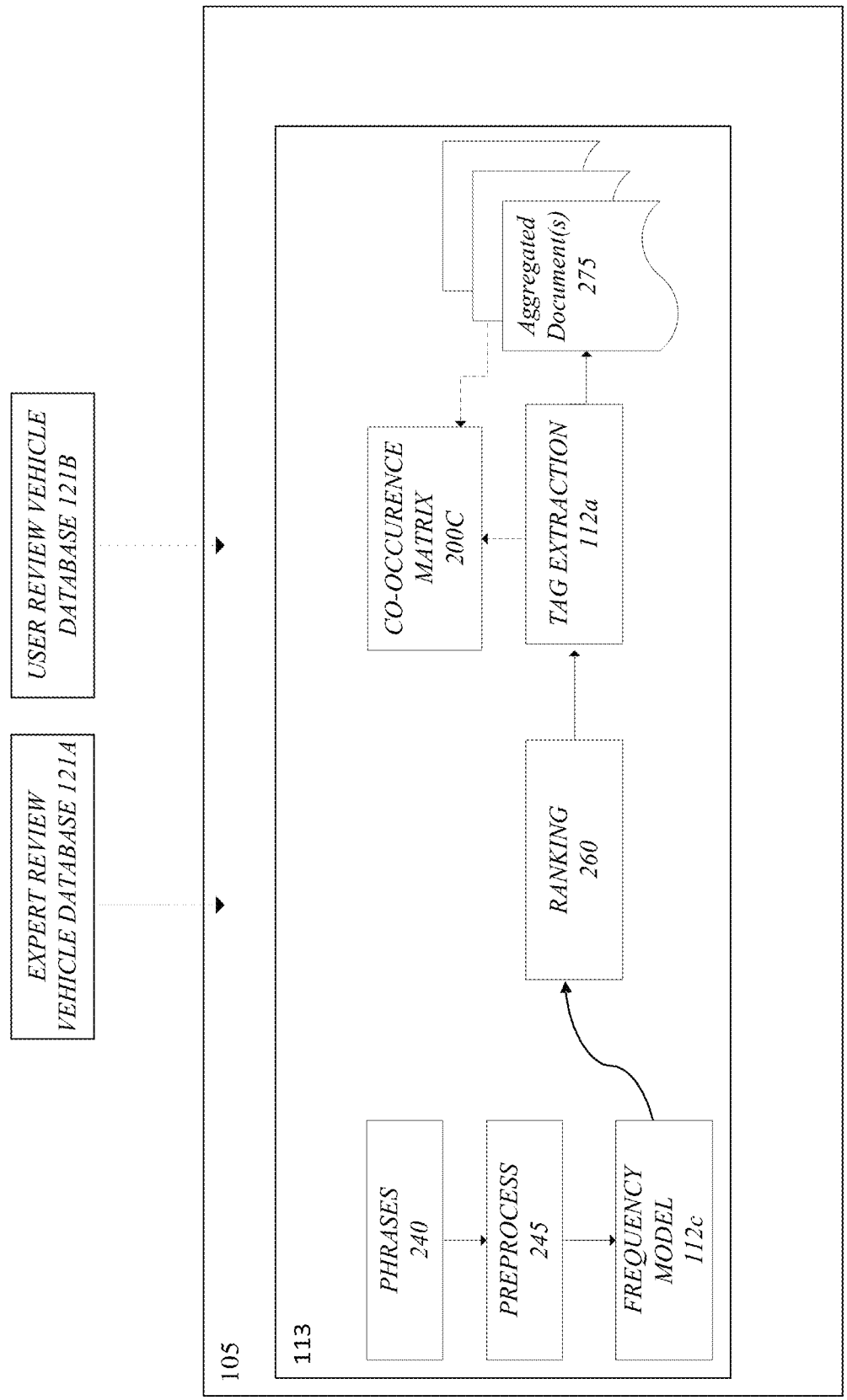
FIG. 2B illustrates an example for providing vehicular information, including generating one or more tags, according to at least one embodiment of the present disclosure.

FIG. 2B illustrates one or more embodiments for a configuration 200B using at least one component of system 100 and machine learning models 112c to generate one or more tags useful for providing a vehicular suggestion to a user. In various embodiments, a tag extraction component 113 ingests data from one or more databases 121, e.g., expert review vehicle database 121A and/or user review vehicle database 121B. The data can be one or more phrases 240 contained in databases 121A and/or 121B. In various embodiments, prior to applying the frequency model 112c, which can be a TD-IFD model, the one or more phrases can be pre-processed 245 to reduce the terms to a single term, where the pre-processing can be performed by the pre-processing component 107 as outlined herein. In various embodiments the pre-processing is omitted or performed at some later stage after the frequency model 112c is applied to the one or more phrases, e.g., the phrases are aggregated in one or more aggregated documents 275, where each aggregated document corresponds to one or more distinct vehicular features (as discussed in further detail below). In various embodiments, the expert review vehicle database 121A and/or the user review vehicle database 121B can be a database related only to one type of make and model, and the tags associated therewith can be related to that particular make and model, which can increase the accuracy that the higher probability tags correspond to that particular make and model (or other specific automotive or vehicular feature) as a large amount of data is dedicated to a particular make and model and the generic terms most likely to correspond to it can be more accurately determined in this context as a result. In various other embodiments, the expert review vehicle database 121A and/or the user review vehicle database 121B can contain reviews for more than one type of make and model (or other particular automotive or vehicular feature).

In various embodiments, the frequency model 112c is applied to data from expert review vehicle database 121A and/or user review vehicle database 121B, where the data includes one or more expert and/or user reviews, and in various embodiments, the data used to train the model 112c contained expert and/or user reviews of the same type as, e.g., from training database 121C, but the data ingested from expert review vehicle database 121A and/or user review vehicle database 121B is distinct.

In various embodiments, once the machine model 112c, e.g., a TF-IDF model, is applied to the data from the expert review vehicle database 121A and/or the user review vehicle database 121B, the tag extraction component 113 can perform a ranking operation 260 to the single terms (if pre-processing occurred) or phrases (if pre-processing did not occur) based on the probabilities associated with the output of the TF-IDF model 112c. The ranking operation 260 can rank whether a particular vehicular or automotive feature, e.g., make and model, corresponds to a single term or phrase. Each single term or phrase that exceeds a threshold, with respect to any one or more particular automotive or vehicular feature, e.g., such a one or more make and models, based on a probability distribution associated with the TF-IDF model 112c is then extracted as a tag by the tag extraction component 113. In various embodiments, if pre-processing or another kind of textual processing has not occurred to reduce a phrase to a single term, the processing can occur at this stage. Each tag meeting or exceeding a probability threshold with respect to a particular vehicle or automotive feature is ascribed to a document associated with the particular vehicular or automotive feature, e.g., a make and model, in the aggregated or generated documents 112a. In various embodiments, within the particular document associated with a particular make and model, the individual tags can be ranked based on the probability distribution associated with the application of the model 112c to the database 121A and/or 121B; and as such, in various embodiments, one or more tags 112b may be present on more than one document of the aggregated documents 112a. In various embodiments, a particular vehicular or automotive feature associated with one or more tags 112b can be a general class corresponding to a set of vehicle or automotive features, e.g., a particular make and model with different years, and a single document can contain different features corresponding to that class, e.g., the same make and model but across different years.

In various embodiments, as discussed in greater detail with reference to FIG. 2C, the tag extraction component 113 can construct a matrix 200C of the one or more tags 113b, prior to aggregating into the one or more documents 112a or after aggregating into the one or more documents 112a.

FIG. 2C illustrates a matrix useful in one or more embodiments applying one or more components of system 100 and/or configuraiton 200B. Multiple tags are illustrated, e.g., tag 1 "jealous," tag 2 "awesome," tag 3 "spacious," tag 4

"fast," and tag 5 "powerful," where the one or more tags can be generated, as outlined and described herein, by applying a machine learning model 112c to data in databases 121A and/or 121B, and then having a tag extraction component 113 extract the tags based on the results or outputs of the machine learning model 112c.

In various embodiments, the tag extraction component 113 can construct the matrix by receiving the scores associated with the outputs of the machine learning model 112c and plotting a relationship between one or more tags and one or makes and models, e.g. the weighted score associated between the one or more tags and the one or more makes and models. Based on the weighted scores, the tag extraction component 113 can apply a threshold that is distinct from the threshold associated with placing a tag in one of the documents of the aggregated documents 112a associated with a particular make and model, e.g., a higher threshold (based on the output of the machine learning model 112c), such that two or more make and modes and/or two or more tags are determined to be co-occurent if the thereshold is exceeded, which is described in greater detail with respect to FIG. 2D and FIG. 2E. Accordingly as shown, a matrix outlining the relationship between the weighted score of each make and model, e.g. "make and model 1," "make and model 2," "make and model 3," "make and model 4," and "make and model 5" is provided in relaiton to tag 1 "jealous," tag 2 "awesome," tag 3 "spacious," tag 4 "fast," and tag 5 "powerful."

FIG. 2D illustrates a co-occurrence matrix 200D useful in one or more embodiments applying one or more components of system 100 and/or configuraiton 200B and utilizing matrix 200C. In various embodiments, tag extraction component 113 can generate the co-occurance matrix 200D utilizing matrix 200C. The tag extraction component 113 can apply a threshold, distinct from the threshold associated with placing one or more tags in one or more documents 112a, where the threshold is based on the output of the machine learning model 112c, e.g. the weights associated with one or more tags associated with respect to one or more makes and models. In various embodiments, if two or more make and models have a weight that exceeds the threshold with respect to one or more tags, the make and models are considered co-occurent. The co-occurrence score can increase if two or more make and models have a weight that exceeds the threshold for more than one tag.

For example, the tag extraction component 113 can apply a threshold of 0.4. In this example, make and model 1 and make and model 2 have a co-occurrence score of 1 because they share one tag with a threshold exceeding 0.35, e.g. tag 1 "jealous," where make and model 1 has weight of 0.5 in relation to tag 1, and make and model has a weight of 0.9 in relation to tag 1. In this example, make and model 2 and make and model 4 have a co-occurrence score of 2, as they share two tags exceeding the threshold, e.g. tag 3 "spacious" and tag 4 "fast," with make and model 2 having a respective weight of 0.4 with respect to both tag 3 and tag 4, and with make and model 4 having a co-occurrence matrix of 0.7 for tag 3 and 0.4 and 0.7 for tag 4. In this example, make and model 3 and make and model 4 are not co-occurrent with respect to one another because they do not share any tags that exceed the threshold.

FIG. 2E illustrates a co-occurrence matrix 200E useful in one or more embodiments applying one or more components of system 100 and/or configuraiton 200B and utilizing matrix 200C. Multiple makes and models are illustrated, e.g. "make and model 1," "make and model 2," "make and model 3," "make and model 4," and "make and model 5," where the make and models have a relationship to one or more of tag 1 "jealous," tag 2 "awesome," tag 3 "spacious," tag 4 "fast," and tag 5 "powerful," and where the one or more tags can be generated, as outlined and described herein, by applying a machine learning model 112c to data in databases 121A and/or 121B, and then having a tag extraction component 113 extract the tags based on the results or outputs of the machine learning model 112c.

In various embodiments, if a user's request is determined (e.g., by the tag extraction component 113) to correspond to a term associated with one or more tags and/or with one or more make and models associated with one or more tags, as determined by the outputs of machine learning model 112c, then the tag extraction component 113 can output to the user the make and model with the highest weight in relation to that tag, every make and model that exceeds a threshold based on the output of machine learning model, and/or one or more makes and models that exceeds a threshold based on the output of the machine learning model in relation to that tag and every make and model that is co-occurrent with the one or make and models as outlined by co-matrix 200D and is co-occurrent with. In various embodiments, in instances where the one or more make and model is co-occurrent with one or more make models, but has a higher co-occurrence score with respect to one or more co-occurrent make and models in relation to another co-occurrent make and model or models, then only the higher scoring make and model(s) of the co-occurrent model(s) can be provided to the user.

FIG. 2D illustrates a co-occurrence matrix 200D useful in one or more embodiments applying one or more components of system 100 and/or configuraiton 200B and utilizing matrix 200C. In various embodiments, tag extraction component 113 can generate the co-occurance matrix 200D utilizing matrix 200C. The tag extraction component 113 can apply a threshold, distinct from the threshold associated with placing one or more tags in one or more documents 112a, where the threshold is based on the output of the machine learning model 112c, e.g. the weights associated with one or more tags associated with respect to one or more makes and models. In various embodiments, if two or more make and models have a weight, with respect to one or more tags that exceeds the threshold, the make and models are considered co-occurent. The co-occurrence score can increase if two or more make and models have a weight that exceeds the threshold with respect to more than one tag.

For example, the tag extraction component 113 can apply a threshold of 0.4. In this example, make and model 1 and make and model 2 have a co-occurrence score of 1 because they share one tag with a threshold exceeding 0.35, e.g. tag 1 "jealous," where make and model 1 has weight of 0.5 in relation to tag 1, and make and model has a weight of 0.9 in relation to tag 1. In this example, make and model 2 and make and model 4 have a co-occurrence score of 2, as they share two tags exceeding the threshold, e.g. tag 3 "spacious" and tag 4 "fast," with make and model 2 having a respective weight of 0.4 with respect to both tag 3 and tag 4, and with make and model 4 having a co-occurrence matrix of 0.7 for tag 3 and 0.4 and 0.7 for tag 4. In this example, make and model 3 and make and model 4 are not co-occurrent with respect to one another because they do not share any tags that exceed the threshold. The relationship of remaining make and models, with respect to co-occurrence, is shown and as indicated in 200D.

In various embodiments, if a user's request is determined (e.g., by the tag extraction component 113) to correspond to a term associated with one or more tags and/or with one or more make and models associated with one or more tags, as determined by the outputs of machine learning model 112c, then the tag extraction component 113 can output to the user, the make and model with the highest weight, every make and model that exceeds a threshold based on the output of machine learning model, and/or one or more make and models that exceeds a threshold based on the output of the machine learning model 113c in relation to the one or more tags and every make and model that is co-occurrent with the one or make and models as outlined by co-matrix 200D. In various embodiments, in instances where the one or more make and models is co-occurrent with multiple make models, but has a higher co-occurrence score with respect to one or more co-occurrent make and models in relation to another co-occurrent make and model or models, then only the higher scoring make and model(s) of the co-occurrent model(s) can be provided to the user.

FIG. 2E illustrates a co-occurrence matrix 200E useful in one or more embodiments applying one or more components of system 100 and/or configuraiton 200B and utilizing matrix 200C. In various embodiments, tag extraction component 113 can generate the co-occurance matrix 200E utilizing matrix 200C. The tag extraction component 113 can apply a threshold, distinct from the threshold associated with placing one or more tags in one or more documents 112a, where the threshold is based on the output of the machine learning model 112c, e.g. the weights associated with one or more tags associated with respect to one or more makes and models. In various embodiments, if two or more tags have a weight, with respect to one or more machine learning models that exceeds the threshold, the tags are considered co-occurent. The co-occurrence score can increase if two or more tags have a weight that exceeds the threshold with respect to more than make and model.

For example, the tag extraction component 113 can apply a threshold of 0.4. In this example, tag 1 and tag 2 have a co-occurrence score of 1 because they share a threshold exceeding 0.35 with respect to make and model 1, where tag 1 has a weight of 0.5 in relation to tag 1, and tag 2 has a weight of 0.9 in relation to make and model 1. In this example, tag 3 and tag 4 have a co-occurrence score of 2, as they share make and models exceeding the threshold, e.g. make and model 2 and make and model 4, with both tags having a weight of 0.4 with respect to make and model 2, and with tag 2 having a weight of 0.7 with respect to make and model 4 and tag 4 having a weight of 0.4 with respect to make and model 4. In this example, tag 2 and tag 3 are not co-occurrent with respect to one another because they do not share any make and models that exceed the threshold. The relationship of remaining tags, with respect to co-occurrence, is shown and as indicated in 200E.

In various embodiments, if a user's request is determined (e.g., by the tag extraction component 113) to correspond to a term associated with one or more tags and/or with one or more make and models associated with one or more tags, as determined by the outputs of machine learning model 112c, then the tag extraction component 113 can output to the user the tag with the highest weight, every tag that exceeds a threshold based on the output of machine learning model, one or more tags that exceeds a threshold based on the output of the machine learning model 113c in relation to the one or more make and models and every tag that is co-occurrent with the one or tags as outlined by co-matrix 200E. In various embodiments, in instances where the one or more tags is co-occurrent with multiple tags, but has a higher co-occurrence score with respect to one or more co-occur-rent tags in relation to another co-occurrent tag or tags, then only the higher scoring tag(s) of the co-occurrent tag(s) can be provided to the user.

In various embodiments, more rows with relationship to more tags and/or makes and models and utilzing an alternate frequency model than 113c (e.g. a word-frequency model different than a TF-IDF model or a model distinct from frequency all together), is possible, as the discussion with respect to FIGS. 2C-2E is exemplary and non-limiting.

Figure 2F:
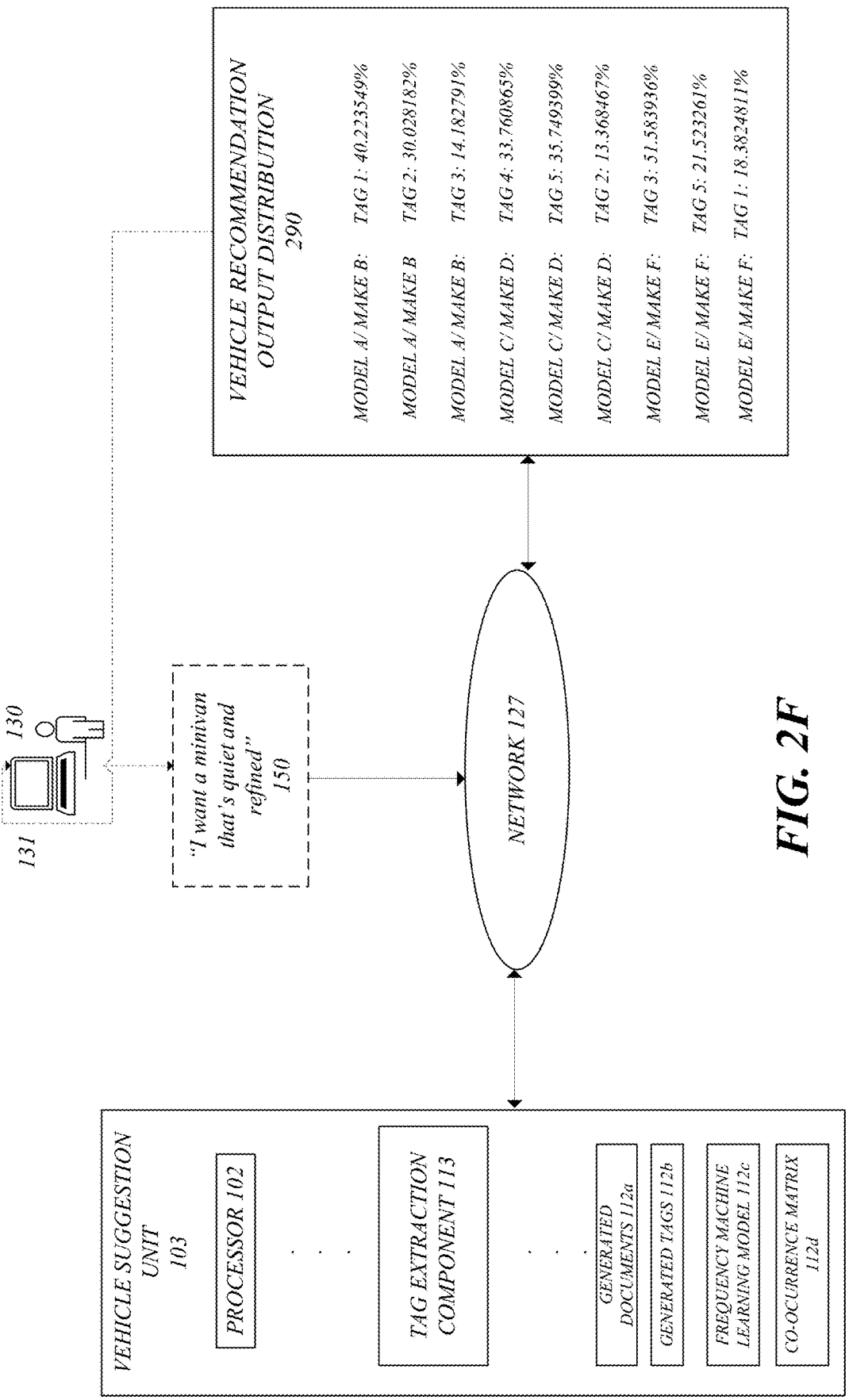
FIG. 2F illustrates an example for providing vehicular information, including using one or more tags, according to at least one embodiment of the present disclosure.

FIG. 2F illustrates one or more embodiments for a configuration 200F using at least one component of system 100, the configuration 200B, and/or the matrix 200C in the context of a user vehicle request. As shown, system 100 and the vehicle suggestion unit 103 associated therewith are condensed/modified, but system 100 and vehicle suggestion unit 103 can include all of the elements as described in FIG. 1. Although the configuration 200F shows using system 100 and portions of vehicle suggestion unit 103 in particular, any computer system configured to perform one or more operations as discussed herein, and with the appropriate software or hardware component, modules, and/or units can be suitably used. In one or more embodiments, since generated documents 112a, the generated tags 112b, and/or machine learning model 112c can be stored in storage, e.g., 110 as shown in FIG. 1, generated documents 112a, the generated tags 112b, and/or machine learning model 112c can be transferred, accessed, and/or used by another system. In various embodiments, the configuration 200F can be a web-plug-in configurable on device 131, in various embodiments the configuration 200F can be entirely accessed by device 131 via a host device, and/or in various embodiments a hybrid approach can be employed.

In one or more embodiments, a user, e.g., 130, can provide an input 150 to vehicle suggestion unit 103 (via a network 127 as shown, but alternatively, directly or as otherwise suitable) with respect to a generic vehicle request, such as a car. For example, the user may input 150 "I want a minivan that's quiet and refined." The tag extraction component 113 can provide an output for one or more tags in relation to one or more particular vehicle features, e.g., particular makes and models. In various embodiments, the tag extraction component 113 can operate as a filter that coordinates with the NLP component 106 to exactly match one or more tags or determine synonyms corresponding to one or more generated tags in relation to the input, where the synonym can be processed to correspond to an existing generated tag, or in the event that it is a synonym to more than one tag, all of the tags for which it is a synonym. The output 290 can be a probability distribution corresponding to one or more tags in relation to one or more makes and models, or the output 290 can be the makes and models with each corresponding tag or tags, or the output 290 can be the tags, or the output 290 can be a tag and/or make and model corresponding to the tag with the higher probability in relation to the user input. In various embodiments, a single make and model in relation to one or more tags, e.g., Model A Make B, can be displayed, and in various embodiments where the phrase corresponds to more than one tag, multiple tags corresponding to multiple makes and models can be displayed, e.g., as shown, Model A Make B, Model C Make D, and Model E Make F.

In various embodiments, where the tags by themselves are provided as an output after the tag extraction component 113 filters the request based on the one or more tags 112b (as may be contained in one or more generated documents 112a, each corresponding to a particular make and model), the user 130 may select via a suitable input/output interface on device 131 one or more tags 112*b* as being of interest. The tag extraction component 113 can provide a first suggestion based on the make and models with the highest probability correlation in relation to the one or more tags 112*b*, and then the tag extraction component 113 can supply additional suggestions, e.g., second and third, based on the next higher probability thresholds with respect to other makes and models and/or by utilizing relationships in the matrix 2000. Accordingly, the tag extraction component 113 can utilize the one or more tags 112*b* as one or user-interface filters for user vehicular or automotive requests.

In one or more embodiments, although not shown in FIG. 2F, the input "I want a minivan that's quiet and refined" can be processed by a suitable component, as described herein or elsewhere, e.g., in one or more training operations as shown with respect to FIG. 2B that can reduce the input to a reduced length, thus making it more processor friendly and making the matching process to one or more tags 112*b* more effective. For example, the input 150 can be pre-processed to "minivan quiet refine" prior to processing the input 150, and the tag extraction component 113 can attempt to match "quiet" and "refined" to the request by comparing the terms "quiet" and "refined" to the tags in the aggregated or generated documents 112*a*, with the output corresponding to make and models with the highest probability in relation to "quiet" and "refined,"; or, alternatively, the tag extraction component 113 can coordinate with the NLP component 106 to determine synonyms which may correspond with the terms "quiet" and "refined" and scan the generated documents 112*a* for tags corresponding to the synonyms, with a resultant output being the make and models with the highest probability in relation to those make and models.

Figure 3A:
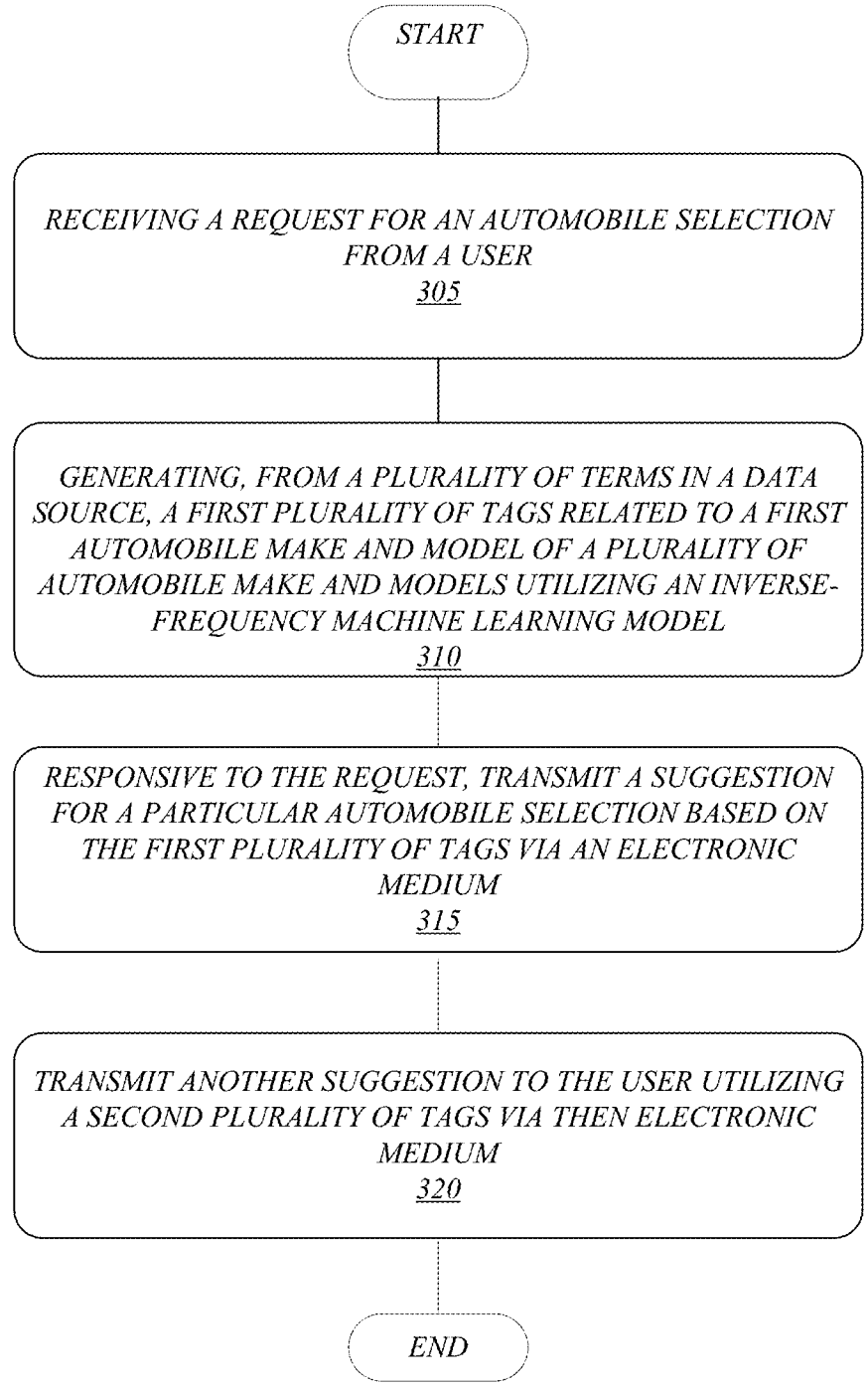
FIG. 3A/3B illustrate examples of one or more processing flows for providing a vehicular recommendation according to at least one embodiment of the present disclosure.

FIG. 3A illustrates an example of a logic flow 300A that may be representative of some or all of the operations executed by one or more embodiments described herein. For example, the logic flow 300A may illustrate operations performed by a vehicular suggestion system to provide a specific recommendation to a vehicle request by a user, where the request contains only generic language.

At block 305, one or more embodiments may include receiving a generic vehicle or automobile request from a user, including generic language with respect to a preferred automobile characteristic or feature, e.g., "a spacious van," "a car to make everyone jealous," "a car with umph," etc. The vehicular suggestion system can utilize this request to assist the user in making a decision, e.g., selecting a particular car. The user request can be received by the system via a chatbot dialog communicating with the user, where the chatbot asks the user generic questions, e.g., "what car are you interested in," and the user indicates a general preference feature, e.g., "I want a car with a sweet ride." Alternatively, in one or more embodiments, the request can be made by the user inputting the request in a single search field of a query system, such as a search engine or a search box associated with a website, or through multiple search fields of the same.

At block 310, one or more embodiments include generating one or more tags that can be useful for addressing the user request. The generation of the tags can occur before or after the user request associated with block 305 and can be generated by applying a machine learning model (MLM), e.g., a TF-IDF model, to one or more review databases that review automotive and vehicular features that are related to features of interest to the user. In various embodiments, the review databases can include either one or both of a corpus of reviews that references two or more of the vehicular or automotive features (e.g., more than one type of make and model and/or one type of automobile) or a corpus of reviews that references only one type of vehicular or automotive feature (e.g., one type of make and model and/or one type of automobile) of the plurality of automobiles.

The one or more tags can be generated by aggregating all terms or phrases in the one or more user and/or expert review vehicle databases that meet a threshold computation associated with the applied machine learning model. The threshold computation can be based on a probability distribution associated with an output of the machine learning model, and each phrase or term can be ascribed with a particular probability that it corresponds to a specific vehicular or automotive feature, e.g., a specific make and model. In relation to the specific vehicular or automotive feature, the terms or phrases can be ranked, and based on the ranking, tags meeting a certain threshold can qualify as tags being associated with a particular vehicular or automotive feature. In various embodiments, each specific vehicular or automotive feature can be associated with its document, and all the tags associated with that specific vehicular or automotive feature can be consolidated into that document, which can make extraction and use at a subsequent time more efficient and effective.

The machine learning model can be trained by processing data from one or more vehicle databases, where the databases can include pricing information for vehicles, functional attributes for vehicles, location of specific vehicles and the general availability of specific vehicles in certain areas, and expert reviews that use generic language to describe specific vehicle features, including particular makes and models. In one or more embodiments, the vehicles are cars, and the information contained in one or more databases are associated with cars. Based on the training determined by the data in the one or more databases, the MLM can be trained to associate one or more specific automobile types in relation to generic automobile language, as the data used to train the database can contain generic language similar to what a user, e.g., consumer, would use in describing a vehicle, where the language was associated with a specific vehicle type. Once the MLM is trained, it can be applied to another dataset of reviews, and one or more tags can be generated therefrom.

In one example, the machine learning model can be a word frequency model that was trained to associate the frequency of a particular make and model (or makes and models) in association with generic phrases or words contained in one or more user or expert reviews contained in the database.

At block 315, one or more embodiments include responsive to the user request of block 305, generating a recommendation for at least one specific vehicle or automobile feature based on the generic automobile request of the user by utilizing the one or more tags. In various embodiments, the recommendation can be providing the one or more tags themselves without specific vehicle or automotive features, and instructing the user to utilize them in performing a search for a vehicular or automotive feature by using the one or more tags in relation to a database containing vehicular or automotive information, providing the one or more tags in relation to one or more automotive or vehicular features, and/or providing only the one or more automotive or vehicular feature, e.g., makes and models, associated with the one or more tags. The specific vehicle feature can be any specific mechanical, aesthetic, or functional feature associated with a vehicle. In one embodiment, the one or more tags are each associated with at least one specific car make and model, and in one embodiment the recommendation is a specific distribution or ranking of multiple car makes and models. Since, in various embodiments, the one or more tags are generated by associating generic language with respect to one or more specific vehicle features, e.g., make and model, in the expert or use review databases, the recommended vehicle feature can be a vehicle feature referenced in the one or more user or expert reviews.

The generated recommendation can involve transmitting a first set of tags to the user in rank order, where the rank order corresponds to the ranking associated with the generation of the tags. Any suitable component of a system as described herein can then map the tags to the user request to provide one or more specific vehicular or automotive suggestions to the user based on the mapping, e.g., the make and models with the highest probability in relation to the tags, which in turn corresponds to the probability that those features are more likely to corresponds to what the user is seeking and requesting.

At block 320, utilizing a second set of tags, another or additional recommendation can be provided or transmitted to the user. The additional recommendation can include to select a second automotive or vehicular feature using a second set of tags. The second set of tags can be provided to the user with an indication that the user utilizes them in a search for a second vehicular feature, and a suitable component of the system as described herein can map or otherwise utilize the tags to provide one or more specific vehicular features to the user, e.g., a second or additional vehicular makes and models. The first set of tags associated with the first user recommendation and transmission can be related to the second set of tags, where the first set of tags can be part of a first document related solely to a specific vehicular or automotive feature, e.g., a first make and model, and the second set of tags can be part of a second document related solely to a second specific vehicular or automotive feature.

Figure 3B:
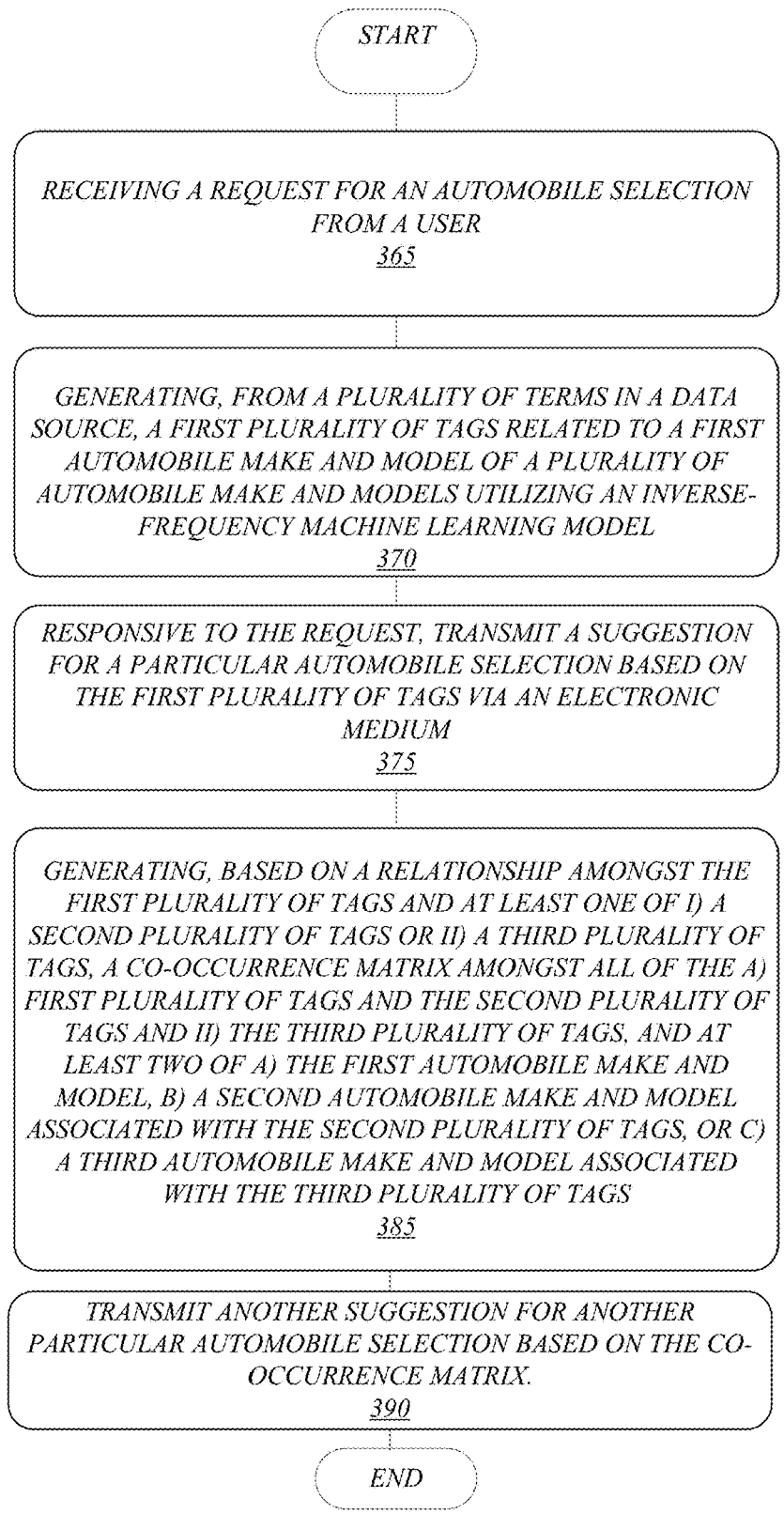

FIG. 3B illustrates an example of a logic flow 300B that may be representative of some or all of the operations executed by one or more embodiments described herein. For example, the logic flow 300B may illustrate operations performed by a vehicular suggestion system to provide a specific recommendation to a vehicle request by a user, where the request contains only generic language.

At block 365, one or more embodiments may include receiving a generic vehicle or automobile request from a user, including generic language with respect to a preferred automobile characteristic or feature, e.g., "a spacious van," "a car to make everyone jealous," "a car with umph," etc. The vehicular suggestion system can utilize this request to assist the user in making a decision, e.g., selecting a particular car. The user request can be received by the system via a chatbot dialog communicating with the user, where the chatbot asks the user generic questions, e.g., "what car are you interested in," and the user indicates a general preference feature, e.g., "I want a car with a sweet ride." Alternatively, in one or more embodiments, the request can be made by the user inputting the request in a single search field of a query system, such as a search engine or a search box associated with a website, or through multiple search fields of the same.

At block 370, one or more embodiments include generating one or more tags that can be useful for addressing the user request. The generation of the tags can occur before or after the user request associated with block 365 and can be generated by applying a machine learning model (MLM), e.g., a TF-IDF model, to one or more review databases that review automotive and vehicular features that are related to features of interest to the user. In various embodiments, the review databases can include either one or both of a corpus of reviews that references two or more of the vehicular or automotive features (e.g., more than one type of make and model and/or one type of automobile) or a corpus of reviews that references only one type of vehicular or automotive feature (e.g., one type of make and model and/or one type of automobile) of the plurality of automobiles.

The one or more tags can be generated by aggregating all terms or phrases in the one or more user and/or expert review vehicle databases that meet a threshold computation associated with the applied machine learning model. The threshold computation can be based on a probability distribution associated with an output of the machine learning model, and each phrase or term can be ascribed with a particular probability that it corresponds to a specific vehicular or automotive feature, e.g., a specific make and model. In relation to the specific vehicular or automotive feature, the terms or phrases can be ranked, and based on the ranking, tags meeting a certain threshold can qualify as tags being associated with a particular vehicular or automotive feature. In various embodiments, each specific vehicular or automotive feature can be associated with its document, and all the tags associated with that specific vehicular or automotive feature can be consolidated into that document, which can make extraction and use at a subsequent time more efficient and effective.

The machine learning model can be trained by processing data from one or more vehicle databases, where the databases can include pricing information for vehicles, functional attributes for vehicles, location of specific vehicles and the general availability of specific vehicles in certain areas, and expert reviews that use generic language to describe specific vehicle features, including particular makes and models. In one or more embodiments, the vehicles are cars, and the information contained in one or more databases are associated with cars. Based on the training determined by the data in the one or more databases, the MLM can be trained to associate one or more specific automobile types in relation to generic automobile language, as the data used to train the database can contain generic language similar to what a user, e.g., consumer, would use in describing a vehicle, where the language was associated with a specific vehicle type. Once the MLM is trained, it can be applied to another dataset of reviews, and one or more tags can be generated therefrom.

In one example, the machine learning model can be a word frequency model that was trained to associate the frequency of a particular make and model (or makes and models) in association with generic phrases or words contained in one or more user or expert reviews contained in the database.

At block 375, one or more embodiments include responsive to the user request of block 305, generating a recommendation for at least one specific vehicle or automobile feature based on the generic automobile request of the user by utilizing the one or more tags. In various embodiments, the recommendation can be providing the one or more tags themselves without specific vehicle or automotive features, and instructing the user to utilize them in performing a search for a vehicular or automotive feature by using the one or more tags in relation to a database containing vehicular or automotive information, providing the one or more tags in relation to one or more automotive or vehicular features, and/or providing only the one or more automotive or vehicular feature, e.g., makes and models, associated with the one or more tags. The specific vehicle feature can be any specific mechanical, aesthetic, or functional feature associated with a vehicle. In one embodiment, the one or more tags are each associated with at least one specific car make and model, and in one embodiment the recommendation is a specific distribution or ranking of multiple car makes and models. Since, in various embodiments, the one or more tags are generated by associating generic language with respect to one or more specific vehicle features, e.g., make and model, in the expert or use review databases, the recommended vehicle feature can be a vehicle feature referenced in the one or more user or expert reviews.

The generated recommendation can involve transmitting a first set of tags to the user in rank order, where the rank order corresponds to the ranking associated with the generation of the tags. Any suitable component of a system as described herein can then map the tags to the user request to provide one or more specific vehicular or automotive suggestions to the user based on the mapping, e.g., the make and models with the highest probability in relation to the tags, which in turn corresponds to the probability that those features are more likely to corresponds to what the user is seeking and requesting.

At block 385, one or more suitable components of a system as described herein can generate, based on a relationship amongst the first set of tags and at least one more additional set of tags, a co-occurrence matrix for revealing one or more relationships between and/or amongst the first set of tags and the additional tags. For example, the co-occurrence matrix can reveal a relationship amongst the first set of tags and the second set of tags or the first set of tags and a third set of tags, or any combination that includes two or more the first set of tags, the second set of tags, and/or the third set of tags.

At block 390, another suggestion can be transmitted to the user utilizing the co-occurrence matrix, e.g., the second or third set of tags and/or one or more make and models associated with the second or third set of tags can be transmitted to the user based on the determined relationships in the co-occurrence matrix.

At block 385, pursuant to at least one alternate embodiment, one or more suitable components of a system as described herein can generate, based on a relationship amongst the first make and model and the second make model based on a co-occurrence matrix that reveals a relationship between the first make and model and the second make and model based the first set of tags and/or the at least one more additional set of tags, a co-occurrence matrix for revealing one or more relationships between and/or amongst the first make and mode and the second make and model.

At block 385, pursuant to at least one alternate embodiment, one or more suitable components of a system as described herein can generate, based on a relationship amongst the first make and model and the second make model based on a co-occurrence matrix that reveals a relationship between the first make and model and the second make and model based the first set of tags and/or the at least one more additional set of tags, a co-occurrence matrix for revealing one or more relationships between and/or amongst the first make and mode and the second make and model. In this alternate embodiment, at block 390, one or more suitable components of a system as described herein, another suggestion can be provided to the user utilizing the generated matrix for a third make and model and/or for a third set of tags related to either the first make and model, the second make and model, and/or a third make and model.

FIG. 3B illustrates an example of a logic flow 300B that may be representative of some or all of the operations executed by one or more embodiments described herein. For example, the logic flow 300B may illustrate operations performed by a vehicular suggestion system to provide a specific recommendation to a vehicle request by a user, where the request contains only generic language.

In one or more embodiments, the flow begins at block 315 of FIG. 3A. In one or more embodiments, the logic flow 300B, at block 365, includes adjusting the ranking based on a specific user-requested feature or input. In one or more embodiments, the generated suggestion of block 365 is made only after considering the specific input or inputs provided by the user, and an adjustment of a generated request is avoided. For example, the user can indicate one or more specific preferences and make specific choice restrictions at the onset, e.g., the user may request that a vehicle or automobile have a specific mechanical feature, e.g., "V4 engine," be within a certain price range "less than thirty-thousand dollars," or available at a certain location or within a certain radius, e.g., "within a thirty-mile radius of Columbus, Ohio."

In one or more embodiments, one or more components of a system (as discussed herein) can alter the output of the MLM to exclude vehicles or automobiles that do not have the requested feature, where the one or more components can use one or more thresholds or matching functions to compare the MLM results to information contained in the expert reviews, or in other databases, e.g., pricing databases, as needed. In another example, the MLM model can be trained to limit its range of responses based on certain keywords, e.g., a price range is associated with a certain weight in a network that necessitates a certain outcome, e.g., zero probability as an output for the specific phrase. These examples are non-limiting, and other configurations and schemes are possible.

At block 335, one or more embodiments include populating an interface or display with at least one recommended vehicular or automotive feature, e.g., a make and model for the requesting user based on an output of the MLM, including a ranking or ordering by probability that the generic request is associated with a specific make and model. In one example, where the user is communicating with a chatbot employing a system that uses at least one machine learning language technique as discussed herein, the output can be in the form of a response from the chatbot and displayed to the user on a computer display. Similarly, in another embodiment, the output can be displayed to the user through any other suitable interface, including as a set of search results or a single field or multiple fields with text therein.

Figure 4A:
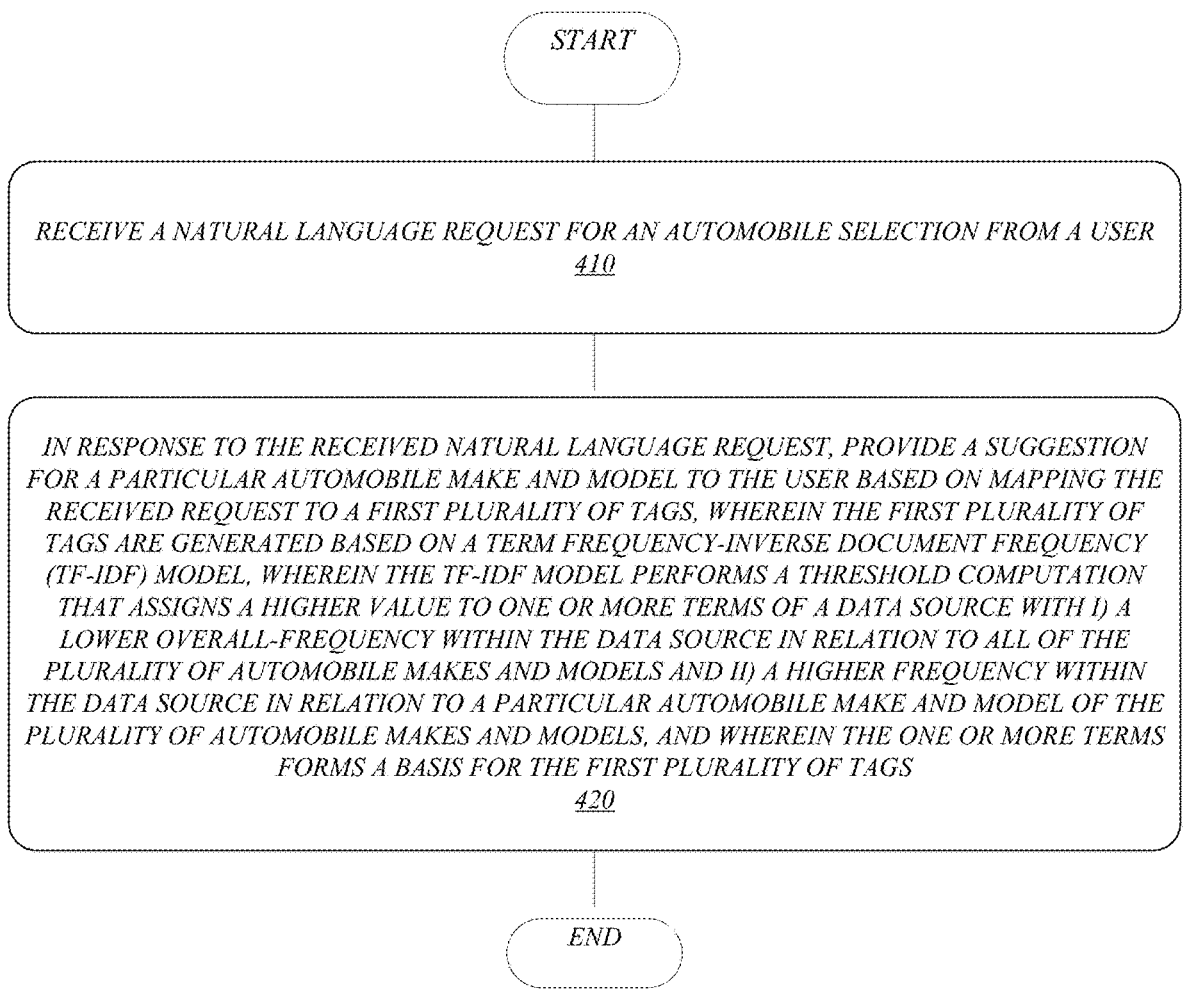
FIG. 4A illustrates an example of a processing flow for providing a vehicular recommendation according to at least one embodiment of the present disclosure.

FIG. 4A illustrates an example of a logic flow 400A that may be representative of some or all of the operations executed by one or more embodiments described herein. For example, the logic flow 400A may illustrate operations performed by a vehicular suggestion system to provide a specific recommendation to a vehicle request by a user, where the request contains only generic language.

At block 410, as outlined in one or more additional embodiments herein, a user provides a natural language search using a suitable interface, and where the request is processed by any suitable component as described herein.

At block 420, in response to the received request, a suggestion for at least one specific vehicle suggestion is provided to the user by utilizing an interface that is configured with one or more tags, and where the one or more tags are generated by applying a TF-IDF machine learning model to user review datasets. Any suitable configuration of an interface for receiving the user request can be employed, including as described herein with reference to FIGS. 1-2F.

Figure 4B:
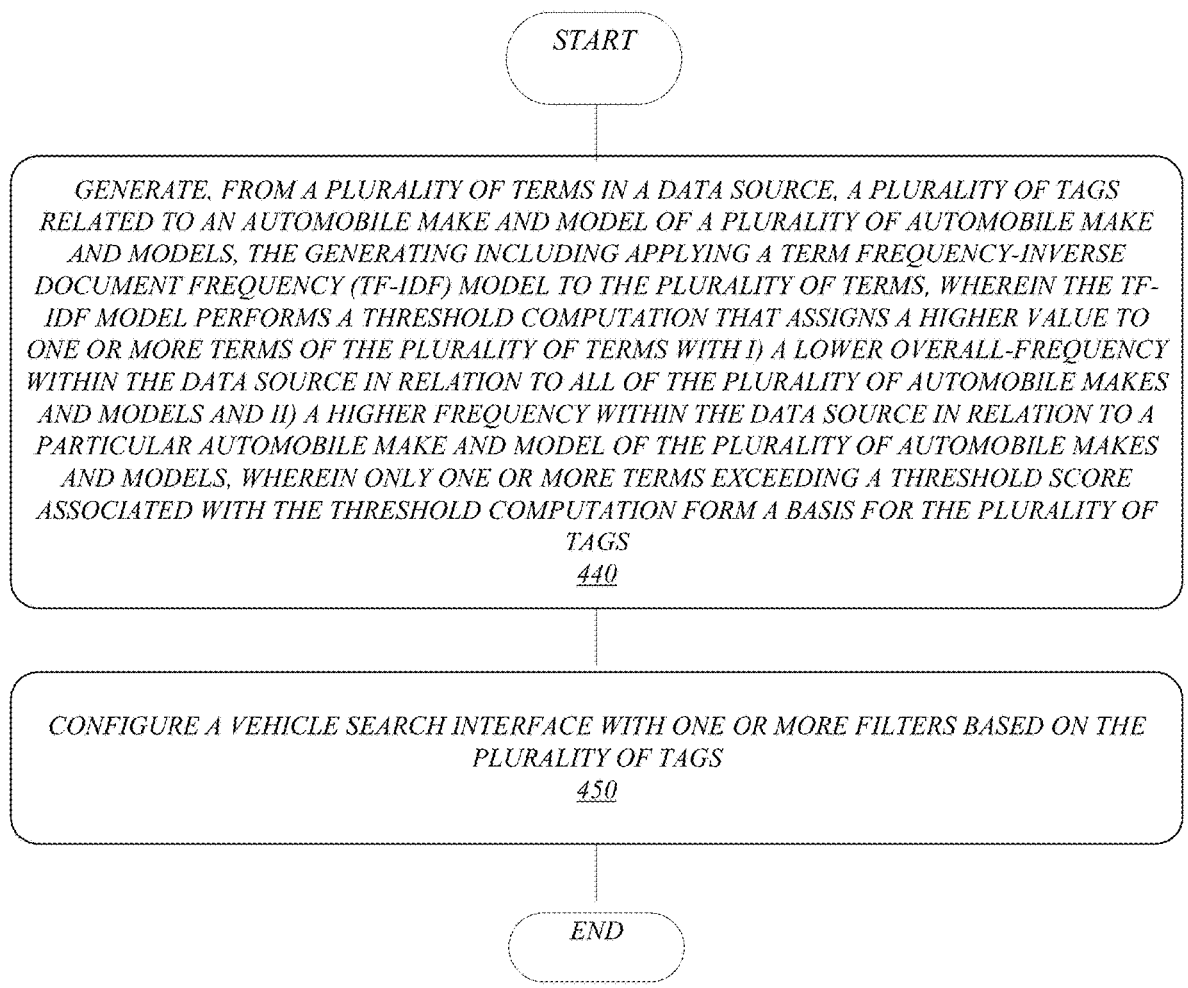
FIG. 4B illustrates an example of a processing flow for configuring an interface in accordance to at least one embodiment of the present disclosure.

FIG. 4B illustrates an example of a logic flow 400B that may be representative of some or all of the operations executed by one or more embodiments described herein. For example, the logic flow 400B may illustrate operations performed by a vehicular suggestion system as described herein.

At block 440, as outlined in one or more additional embodiments herein, one or more tags are generated using a TF-IDF machine learning model to one or more databases, including review databases.

At block 450 the tags are configured to map one or more user requests to the tags, including as described herein with reference to FIGS. 1-2F. For example, based on the output of the TF-IDF model, each tag can be associated with one or more probabilities that one or more specific vehicular features correspond to that tag. When a user enters a request via an interface that is configured by the one or more tags, a suitable component of a system as described herein can process the request to determine an exact match between one or more generic terms of the user request and the one or more tags. If an exact match is found, at least one specific vehicle feature corresponding to the highest probability and the tag is outputted to the user. IF an exact match is not found, the suitable component can coordinate with one or more additional components to determine synonyms for the generic terms in the user request, and then compare those synonyms to the one or more tags. If the at least one synonym corresponds to one or more tags, then the specific vehicular or automotive feature with the highest probability in relation to the one or more tags can be outputted to the user. In various embodiments, the tags are part of a generated document set, where each document of the set corresponds to a specific vehicular or automotive features, such as a specific make and model, and where the document set can be queried by one or more components of the system to enhance the map or filtering operation.

Figure 5:
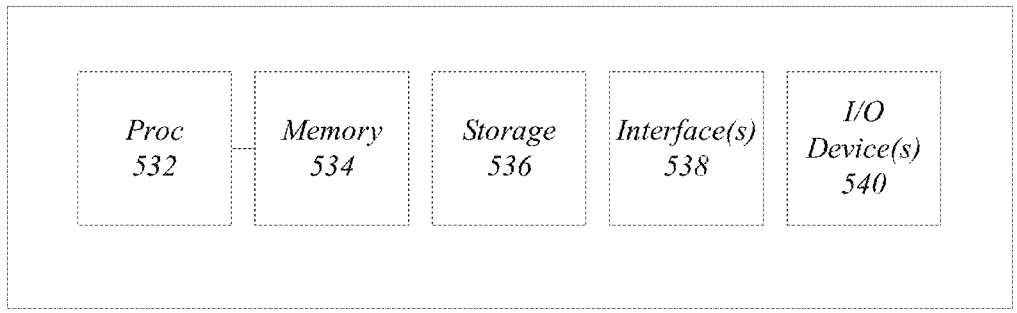
FIG. 5 illustrates a machine learning system according to an embodiment of the present disclosure

FIG. 5 illustrates an example of a vehicular suggestion system 506. The vehicular suggestion system 506 includes one or more processor(s) 532, memory 534, storage 536, one or more interface(s) 538, and one or more I/O device(s) 540.

In embodiments, the vehicular suggestion system 506 may be a processing system that includes one or more servers or computing devices that are interconnected via one or more network links, e.g., wired, wireless, fiber, etc. In some instances, the transaction services system may be a distributed computing system. Each of the servers may include one or more processor(s) 532, which may include one or more processing cores to process information and data. Moreover, the one or more processors 532 can include one or more processing devices, such as a microprocessor manufactured by Intel™, AMD™, or any of various processors. The disclosed embodiments are not limited to any type of processor(s).

Memory 534 can include one or more memory (volatile or non-volatile) devices configured to store instructions used by the one or more processors 532 to perform one or more operations consistent with the disclosed embodiments. For example, memory 534 can be configured with one or more software instructions, such as programs that can perform one or more operations when executed by the one or more processors 532.

The disclosed embodiments are not limited to separate programs or computers configured to perform dedicated tasks. For example, memory 534 can include a single program that performs the operations or could comprise multiple programs. Memory 534 can also store data that can reflect any type of information in any format that the system can use to perform operations consistent with the disclosed embodiments.

In embodiments, the transaction services system 504 may include one or more storage devices 536. The storage devices 536 may include HDDs, flash memory devices, optical storage devices, floppy storage devices, etc. In some instances, the storage devices 556 may include cloud-based storage devices that may be accessed via a network interface. In some embodiments, the storage 536 may be configured to store one or more databases and/or as a distributed database system to store information and data. Databases can include one or more memory devices that store information and are accessed and/or managed through the transaction services system 504. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, transaction services system 504 can include databases located remotely from other transaction services system 504 devices. The databases can include computing components (e.g., database management system, database server, etc.) configured to receive and process requests for data stored in memory devices of databases and to provide data from databases.

Figure 6:
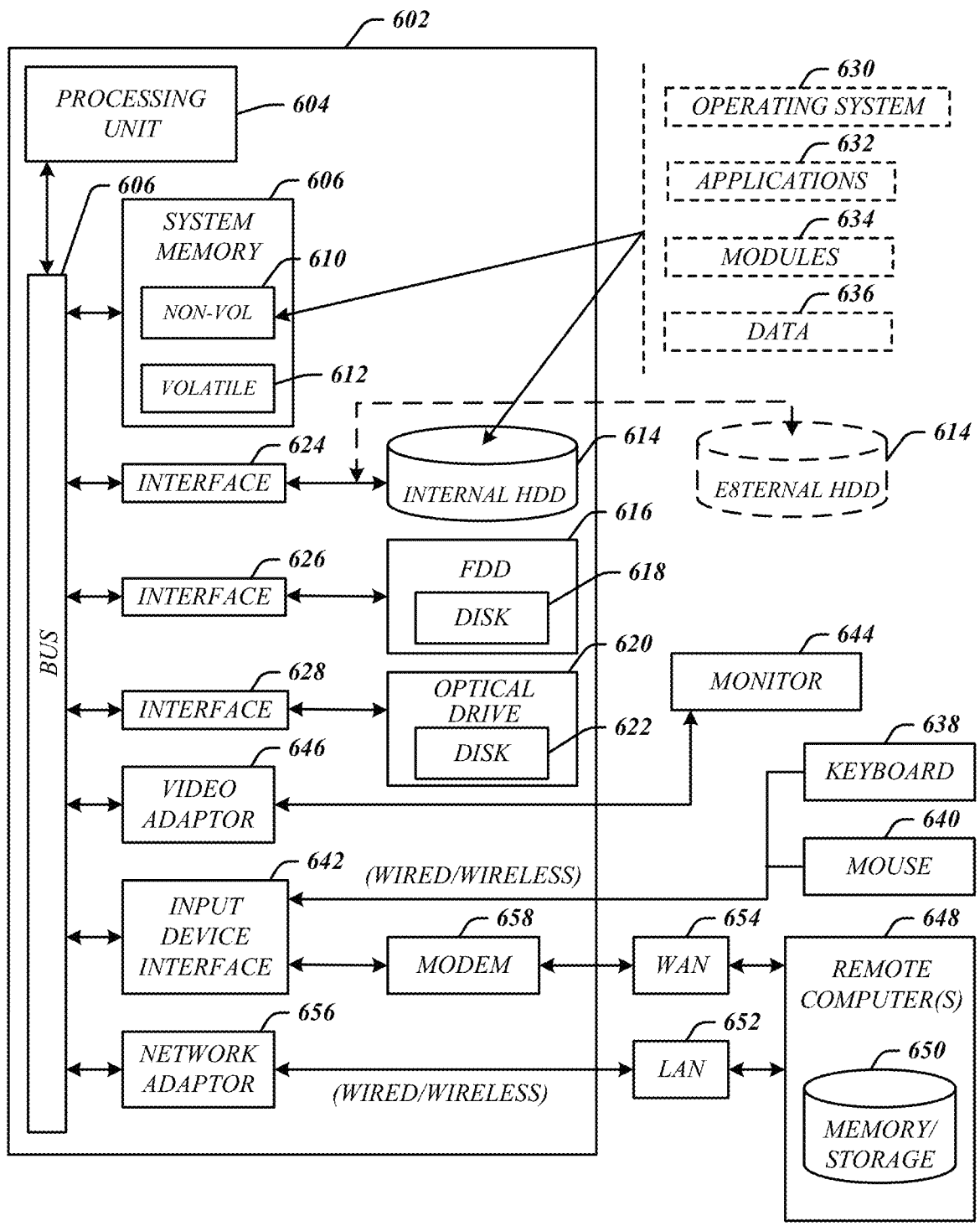
FIG. 6 illustrates an embodiment of a computing architecture useful with at least one embodiment of the present disclosure.

FIG. 6 illustrates an embodiment of an exemplary computing architecture 600 suitable for implementing various embodiments as previously described. In one embodiment, the computing architecture 600 may include or be implemented as part of system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, gamepads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
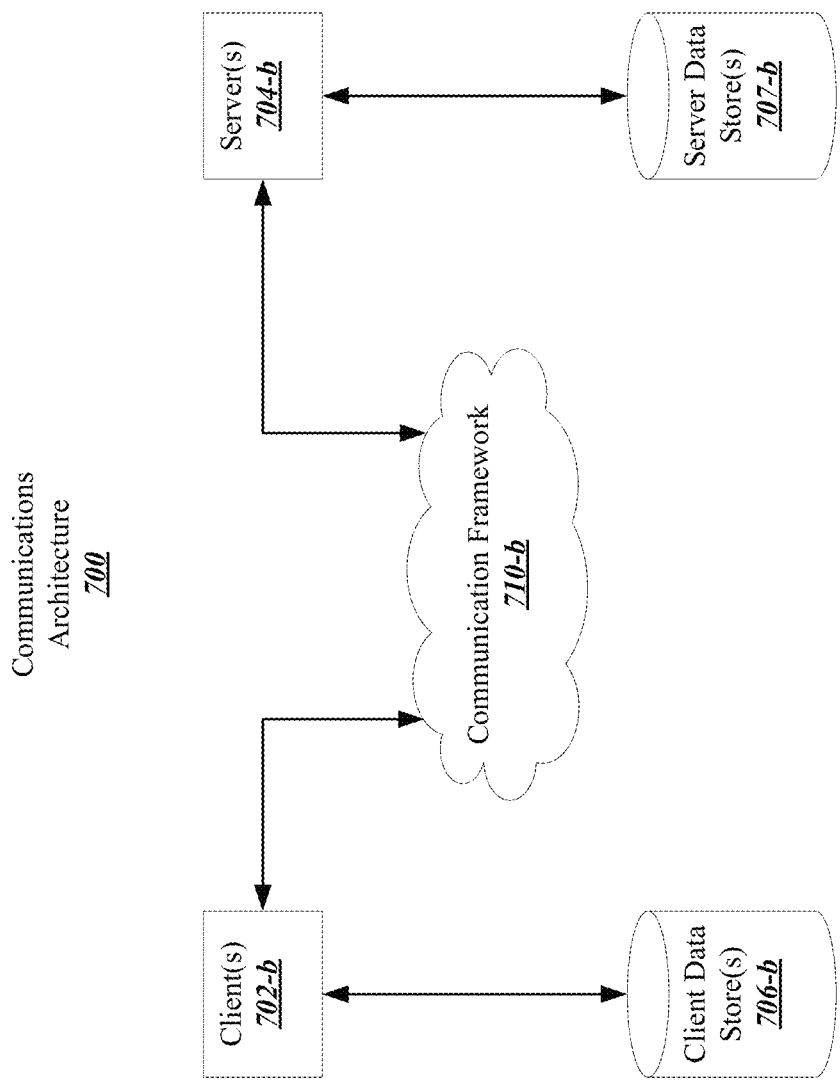
FIG. 7 illustrates an embodiment of a communications architecture useful with at least one embodiment of the present disclosure.

FIG. 7 is a block diagram depicting an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700, which may be consistent with system 100.

As shown in FIG. 7, the communications architecture 700 includes one or more clients 702 and servers 704. The servers 704 may implement the server device 526. The clients 702 and the servers 704 are operatively connected to one or more respective client data stores 706 and server data stores 707 that can be employed to store information local to the respective clients 702 and servers 704, such as cookies and/or associated contextual information.

The clients 702 and the servers 704 may communicate information between each other using a communication framework 710. The communications framework 710 may implement any well-known communications techniques and protocols. The communications framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments of systems, computer program products, methods, and techniques for training and using MLMs and tags associated with those MLMs in the vehicular context are provided above and herein. However, at least one of the above embodiments could be adjusted and applied to any product or service that is associated with reviews, including expert or user reviews, including but not limited to real estate, video games, sporting equipment, books, and media, etc. ("other product and/or service"). In at least one embodiment, the MLM or MLMs and any generated tags associated therewith, including tags part of a co-occurrence matrix, and as employed by associated systems, components, methods, and techniques, would be trained as discussed herein, with at least one adjustment, i.e. that training of an MLM or MLMs would be from a source, e.g., review databases and datasets associated with the other product and/or service (where the sources have generic language in association with specific features associated with the other product and/or service). In at least one embodiment, the MLM trained from the review sources associated with that other product and/or service could be used to provide a specific feature suggestion with respect to that other product and/or service to a user making a generic request with respect to that other product and/or service and/or to generate one or more tags useful for assisting a user with making an automobile selection and/or to construct a co-occurrence matrix for the same. In at least one embodiment, the generic request with respect to the other product and/or service can be received by a single interface as discussed herein and the MLM can have feedback adjustments (e.g., based on user selection) as discussed herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
   a request for an automobile selection;
   applying a term frequency-inverse document frequency (TF-IDF) model to a plurality of terms in a data source comprising a corpus of reviews to compute a respective score for each of the terms, wherein the respective scores of a first subset of the plurality of terms exceed a threshold score;
   aggregating all terms of the first subset into a plurality of documents, wherein each document corresponds to a respective vehicular feature, of a plurality of vehicular features;
   ranking the terms of the first subset based on the respective scores;

generating, based on the aggregating and ranking of the terms of the first subset, a first plurality of tags related to a first automobile make and model of a plurality of automobile make and models, wherein each tag of the first plurality of tags is associated with a respective plurality of probability distributions generated by the TF-IDF model, each probability distribution associated with one of the plurality of vehicular features, the first plurality of tags further generated based on the probability distributions;

transmitting the first plurality of tags in rank-order based on the scores of the ranked terms as a first suggestion for a particular automobile selection;

generating, based on the respective scores of the terms of the first subset, a first co-occurrence matrix between the first plurality of tags and the plurality of automobile makes and models;

generating, based on the first co-occurrence matrix, a second co-occurrence matrix between the first plurality of tags and a second plurality of tags;

determining, based on the second co-occurrence matrix, a co-occurrence relationship between a first tag of the first plurality of tags and a second tag of the second plurality of tags, wherein the first tag and the second tag have scores exceeding a co-occurrence threshold;

transmitting a second suggestion including the first tag based on the co-occurrence relationship and the first tag having a higher score than the second tag; and updating, by the TF-IDF model based on a selection of the first automobile make and model, the plurality of probability distributions of each tag of the first plurality of tags.

2. The method of claim 1, wherein the corpus of reviews of the data source includes at least one of i) a corpus of reviews that references two or more of the plurality of automobiles or ii) a corpus of reviews that references only one of the plurality of automobiles, wherein the first suggestion includes a recommendation to select the first automobile, wherein the first plurality of tags comprise a first term aggregated into a first document of the plurality of documents and a second term aggregated into a second document of the plurality of documents.

3. The method of claim 2, wherein the request is a natural language request, wherein the transmitting the first plurality of tags as the first suggestion comprises:
filtering the natural language request using the first plurality of tags, wherein the filtering automatically maps the first plurality of tags to the natural language request.

4. The method of claim 2, the method further comprising:
transmitting a third suggestion including a recommendation to select a second one of the plurality of automobile make and models based on the second plurality of tags.

5. The method of claim 4, wherein the first plurality of tags and the second plurality of tags are related to one another, and wherein the second plurality of tags are based on a third document of the plurality of documents that includes terms related solely to the second one of the plurality of automobile make and models.

6. The method of claim 2, the method further comprising:
transmitting a third suggestion including a recommendation to utilize the second plurality of tags related to the first plurality of tags for making the automobile selection request.

7. The method of claim 6, wherein the second plurality of tags are associated with a second automobile make and model of the plurality of automobile make and models.

8. The method of claim 2, the method further comprising:
generating, from the plurality of terms in the data source, the second plurality of tags related to a second automobile make and model of the plurality of automobile make and models, the generating including applying the TF-IDF model to the plurality of terms.

9. The method of claim 8, the method further comprising:
generating, based on the first co-occurrence matrix, a third co-occurrence matrix between the first automobile make and model and the second automobile make and model, and wherein the first suggestion further specifies at least one of i) to select the second automobile make and model or ii) to utilize the second plurality of tags as part of the search for making the automobile request.

10. The method of claim 2, the method further comprising:
generating, based on a relationship amongst the first plurality of tags, a second plurality of tags, and a third plurality of tags, a third co-occurrence matrix amongst all of the first plurality of tags, the second plurality of tags, and the third plurality of tags, the first automobile make and model, a second automobile make and model associated with the second plurality of tags, and a third automobile make and model associated with the third plurality of tags.

11. The method of claim 10, the method further including:
transmitting a third suggestion for another particular automobile selection based on the third co-occurrence matrix.

12. An apparatus, comprising:
a memory to store instructions; and
processing circuitry, coupled with the memory, operable to execute the instructions, that when executed, cause the processing circuitry to:
receive a natural language request for an automobile selection;
in response to the received natural language request, apply a term frequency-inverse document frequency (TF-IDF) model to a plurality of terms of a data source comprising a corpus of reviews to compute a respective score for each of the terms, wherein the respective scores of a first subset of the plurality of terms exceed a threshold score;
aggregating each term of the first subset of the plurality of term into a plurality of documents, wherein each document corresponds to a respective vehicular feature, of a plurality of vehicular features;
rank the terms of the first subset based on the respective scores;
generate, based on the aggregating and ranking of the terms of the first subset, a first plurality of tags related to a first automobile make and model of a plurality of automobile make and models, wherein each tag of the first plurality of tags is associated with a respective plurality of probability distributions generated by the TF-IDF model, each probability distribution associated with one of the plurality of vehicular features, the first plurality of tags further generated based on the probability distributions;
generate, based on the respective scores of the terms of the first subset, a first co-occurrence matrix between the first plurality of tags and the plurality of automobile makes and models;
generate, based on the first co-occurrence matrix, a second co-occurrence matrix between the first plurality of tags and a second plurality of tags;

determine, based on the second co-occurrence matrix, a co-occurrence relationship between a first tag of the first plurality of tags and a second tag of the second plurality of tags, wherein the first tag and the second tag have scores exceeding a co-occurrence threshold;

transmit a second suggestion including the first tag based on the co-occurrence relationship and the first tag having a higher score than the second tag; and update, by the TF-IDF model based on a selection of the first automobile make and model, the plurality of probability distributions of each tag of the first plurality of tags.

13. The apparatus of claim 12, wherein the first plurality of tags comprise a first term aggregated into a first document of the plurality of documents and a second term aggregated into a second document of the plurality of documents.

14. The apparatus of claim 12, wherein the corpus of reviews of the data source is a corpus of reviews that includes a reference to at least one of the plurality of automobiles.

15. The apparatus of claim 12, wherein the processing circuitry is further caused to:
provide a third suggestion including a recommendation for a second one of the plurality of automobile makes and models, wherein the third suggestion is based on a relationship between the first plurality of tags and the second plurality of tags.

16. The apparatus of claim 15, wherein the first plurality of tags and the second plurality of tags are related to one another, and wherein the second plurality of tags are based on another aggregated document that includes terms related solely to the second one of the plurality of automobile makes and models.

17. The apparatus of claim 14, wherein the processing circuitry caused to:
transmit a third suggestion including a recommendation to utilize a second plurality of tags related to the first plurality of tags for making an automobile selection request via an electronic medium.

18. The apparatus of claim 17, wherein the second plurality of tags are associated with a second automobile make and model of the plurality of automobile makes and models.

19. A non-transitory computer-readable storage medium storing computer-readable program code executable by a processor to:
receive a natural language request for an automobile selection;
apply a term frequency-inverse document frequency (TF-IDF) model to a plurality of terms in a data source comprising a corpus of reviews to compute a respective score for each of the terms, wherein the respective scores of a first subset of the plurality of terms exceed a threshold score;
aggregate all terms of the first subset into a plurality of documents, wherein each document corresponds to a respective vehicular feature, of a plurality of vehicular features;
configure a vehicle search interface with one or more filters based on the plurality of tags;
rank the terms of the first subset based on the respective scores;
generate, based on the aggregating and ranking of the terms of the first subset, a first plurality of tags related to a first automobile make and model of a plurality of automobile make and models, wherein each tag of the first plurality of tags is associated with a respective plurality of probability distributions generated by the TF-IDF model, each probability distribution associated with one of the plurality of vehicular features, the first plurality of tags further generated based on the probability distributions;
transmit the plurality of tags in rank-order based on the scores of the ranked terms as a first suggestion for a particular automobile selection via the vehicle search interface;
generate, based on the respective scores of the terms of the first subset, a first co-occurrence matrix between the first plurality of tags and the plurality of automobile makes and models;
generate, based on the first co-occurrence matrix, a second co-occurrence matrix between the first plurality of tags and a second plurality of tags;
determine, based on the second co-occurrence matrix, a co-occurrence relationship between a first tag of the first plurality of tags and a second tag of the second plurality of tags, wherein the first tag and the second tag have scores exceeding a co-occurrence threshold;
transmit a second suggestion including the first tag based on the co-occurrence relationship and the first tag having a higher score than the second tag; and
update, by the TF-IDF model based on a selection of the first automobile make and model via the vehicle search interface, the plurality of probability distributions of each tag of the first plurality of tags.

20. The computer-readable storage medium of claim 19, storing computer-readable program code executable by the processor to:
provide a third suggestion including a recommendation for a second one of the plurality of automobile makes and models, wherein the third suggestion is based on a relationship between the first plurality of tags and the second plurality of tags.

* * * * *

UNITED STATES PATENT AND TRADEMARK OFFICE
CERTIFICATE OF CORRECTION

PATENT NO. : 11,232,110 B2  
APPLICATION NO. : 16/549530  
DATED : January 25, 2022  
INVENTOR(S) : Micah Price et al.

Page 1 of 1

It is certified that error appears in the above-identified patent and that said Letters Patent is hereby corrected as shown below:

In the Claims

Column 30, Claim 1, Line 55; Please replace "a request for an automobile selection;" with --receiving a request for an automobile selection;--

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*